(12) United States Patent
Huo et al.

(10) Patent No.: US 12,200,199 B2
(45) Date of Patent: Jan. 14, 2025

(54) COLOUR COMPONENT PREDICTION METHOD, ENCODER, DECODER AND STORAGE MEDIUM

(71) Applicant: GUANGDONG OPPO MOBILE TELECOMMUNICATIONS CORP., LTD., Guangdong (CN)

(72) Inventors: Junyan Huo, Dongguan (CN); Shuai Wan, Dongguan (CN); Yanzhuo Ma, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 18/449,877

(22) Filed: Aug. 15, 2023

(65) Prior Publication Data
US 2023/0388491 A1    Nov. 30, 2023

Related U.S. Application Data

(63) Continuation of application No. 17/722,082, filed on Apr. 15, 2022, now Pat. No. 11,778,172, which is a
(Continued)

(51) Int. Cl.
*H04N 19/105* (2014.01)
*H04N 19/132* (2014.01)
(Continued)

(52) U.S. Cl.
CPC ......... *H04N 19/105* (2014.11); *H04N 19/132* (2014.11); *H04N 19/176* (2014.11); *H04N 19/186* (2014.11)

(58) Field of Classification Search
CPC .. H04N 19/105; H04N 19/132; H04N 19/176; H04N 19/186; H04N 19/14;
(Continued)

(56) References Cited

U.S. PATENT DOCUMENTS 10,404,980 B1  9/2019  Zhao et al.
10,419,754 B1  9/2019  Zhao et al.
(Continued)

FOREIGN PATENT DOCUMENTS

CN    101356818 A    1/2009
CN    101496406 A    7/2009
(Continued)

OTHER PUBLICATIONS

Brief communication for European Application No. 19919998.5 issued Nov. 14, 2023. 5 pages.
(Continued)

*Primary Examiner* — Marnie A Matt
(74) *Attorney, Agent, or Firm* — Perkins Coie LLP

(57) ABSTRACT

Disclosed are a colour component prediction method, an encoder, a decoder, and a storage medium. The method includes: determining adjacent reference pixels of a current block in a picture; constructing a subset of adjacent reference pixels according to the adjacent reference pixels, wherein the subset of adjacent reference pixels contains a part of the adjacent reference pixels; and calculating model parameters of a prediction model according to the subset of adjacent reference pixels, wherein the prediction model includes N prediction sub-models, the N prediction sub-models correspond to N groups of model parameters, and the prediction sub-models are used to perform, through corresponding model parameters, cross-component prediction of colour components to be predicted.

16 Claims, 5 Drawing Sheets

Related U.S. Application Data continuation of application No. 17/397,680, filed on Aug. 9, 2021, now Pat. No. 11,368,680, which is a continuation of application No. PCT/CN2019/113771, filed on Oct. 28, 2019.

(60) Provisional application No. 62/819,851, filed on Mar. 18, 2019.

(51) Int. Cl.
  *H04N 19/176* (2014.01)
  *H04N 19/186* (2014.01)

(58) Field of Classification Search
  CPC .... H04N 19/117; H04N 19/51; H04N 19/182; H04N 19/107; H04N 19/61; H04N 19/82; H04N 19/86; H04N 19/159; H04N 19/149
  USPC ................................................ 375/240.02
  See application file for complete search history.

(56) References Cited

U.S. PATENT DOCUMENTS

| | | |
|---|---|---|
| 2008/0008239 A1 | 1/2008 | Song et al. |
| 2008/0165846 A1 | 7/2008 | Kim |
| 2009/0141804 A1 | 6/2009 | Wang et al. |
| 2011/0255591 A1 | 10/2011 | Kim et al. |
| 2012/0287995 A1 | 11/2012 | Budagavi |
| 2013/0188703 A1 | 7/2013 | Liu et al. |
| 2014/0294061 A1 | 10/2014 | Zhang et al. |
| 2015/0264363 A1 | 9/2015 | Pu et al. |
| 2015/0365684 A1 | 12/2015 | Chen et al. |
| 2017/0251213 A1 | 8/2017 | Ye et al. |
| 2017/0359595 A1 | 12/2017 | Zhang et al. |
| 2018/0077426 A1 | 3/2018 | Zhang et al. |
| 2019/0045184 A1 | 2/2019 | Zhang et al. |
| 2020/0213619 A1 | 7/2020 | Aono et al. |
| 2021/0281853 A1 | 9/2021 | Moon et al. |

FOREIGN PATENT DOCUMENTS

| | | | |
|---|---|---|---|
| CN | 102625126 | A | 8/2012 |
| CN | 103200401 | A | 7/2013 |
| CN | 106105200 | A | 11/2016 |
| CN | 103814574 | B | 1/2018 |
| CN | 107580222 | A | 1/2018 |
| CN | 108702515 | A | 10/2018 |
| CN | 109196867 | A | 1/2019 |
| CN | 109218730 | A | 1/2019 |
| CN | 109417623 | A | 3/2019 |
| GB | 2567249 | A | 4/2019 |
| WO | 2018116925 | A1 | 6/2018 |

OTHER PUBLICATIONS

Decision to Refuse for European Application No. 19919998.5 issued Dec. 4, 2023. 10 pages.
Written Opinion of the International Searching Authority dated Jan. 16, 2020 cited in PCT/CN2019/113771 with translation, 7 pages.
Search Report for European Application No. 24155363.5 issued May 15, 2024, 11 pages.
Hearing Notice for Indian Application No. 202117036495 issued Jul. 31, 2024, 2 pages.
International Search Report issued Jan. 16, 2020 of PCT /CN2019/113771 (6 pages).
EP Search Report dated Feb. 11, 2022 in EP Application No. 19919998.5, 11 pages.
First Examination Report mailed Mar. 16, 2022 in India Application No. 202117036495, 6 pages.
XP30023716A, JVET, Algorithm Description of Joint Exploration Test Model 7 (JEM 7), Joint Video Exploration Team (JVET) Document: JVET-G 1001-v 1, of ITU-T SG 16 WP 3 and ISO/IEC JTC 1/SC 29/WG 11, 7th Meeting: Torino, IT, Jul. 13-21, 2017, 48 pages.
XP30200351A, Qualcomm Inc., CE3: On MMLM (Test 2.1), Joint Video Experts Team (JVET), of ITU-T SG 16 WP 3 and ISO/IEC JTC 1/SC 29/WG 11, 13th Meeting: Marrakech, MA, Jan. 9-18, 2019, 4 pages.
XP30213414A, Xidian University et al., CE3-related: Fixed Reference Samples Design for CCLM, Joint Video Experts Team (JVET), of ITU-T SG 16 WP 3 and 1S0/IEC JTC 1/SC 29/WG 11, 13th Meeting: Marrakech, MA, Jan. 9-18, 2019, Document: JVET-M0211-v2, 5 pages.
Examination Report for European Application No. 19919998.5 issued Nov. 10, 2022. 7 pages.
Fan, Y. "Research on Fast Decision Algorithm of H.264/AVC Intra-mode" Thesis submitted to Chongqing University; Apr. 2016. 80 pages with English abstract.
First Office Action for Chinese Application No. 202110993233.6 issued Sep. 28, 2022. 22 pages with English translation.
ITRI International "Non-CE3: Adaptive multiple cross-component linear model" JVET-K0536_r1; JVET of ITU-T SG 16 WP 3 and ISO/IEC JTC 1/SC 29/WG 11; 11th Meeting; Ljubljana, SL; Jul. 10-18, 2018. 9 pages.
Northwestern Polytechnical University et al. "CE3: Reduced reference samples range for CCLM_L and CCLM_T (Tests 1.3.1, 1.3.2 and 1.3.3)" JVET-N0130-v1; JVET of ITU-T SG16 WP3 and ISO/IEC TJC 1/SC 29/WG11 14th Meeting; Geneva, CH Mar. 19-27, 2019. 7 pages.
Notice of Reasons for Refusal for Japanese Application No. 2021-551793 issued Sep. 2, 2022. 17 pages with English translation.
Qualcomm Inc. "Cross-check of JVET-K0204: On cross-component linear model simplification" JVET-K0512r1; JVET of ITU-T SG 16 WP 3 and ISO/IEC JTC 1/SC 29/WG 11; 11th Meeting; Ljubljana, SL; Jul. 10-18, 2018. 10 pages.
Japan Decision of Refusal mailed Mar. 24, 2023 in JP App. 2021-551793, 8 pages.
EP Summons to attend oral proceedings mailed May 4, 2023 in EP App. 19919998.5, 9 pages.
Xiang MA et al_, CE3: CCLM/!\iIDLM using simplified coefficients derivation method (Test 5.6. t, 5.6.2 and 5.6.3), Joint /ideo Experts Team (JVET) of ITU-T SG 16 WP 3 and ISOIIEC JTC I/SC 29/WG .11, 12th Meeting: Macao, CN, Oct. 3-12, 2018, Document: JVET-L0340r1, 14 pages.
Non-final Office Action for U.S. Appl. No. 17/722,082 issued Feb. 1, 2023. 16 pages.
Notice of Allowance for U.S. Appl. No. 17/722,082 issued May 30, 2023. 8 pages.
Corrected Notice of Allowability for U.S. Appl. No. 17/722,082 issued Jul. 26, 2023. 6 pages.
Non-final Office Action for U.S. Appl. No. 17/397,680 issued Nov. 8, 2021. 17 pages.
Joint Collaborative Team on Video Coding (JCT-VC) of ITU-T SG 16 WP 3 and ISO/IEC JTC 1/SC 29/WG 11 16th Meeting: SanJose, US, Jan. 9-17, 2014, Document: JCTVC-P0035 (Year: 2014).
Notice of Allowance for U.S. Appl. No. 17/397,680 issued Feb. 25, 2022. 8 pages.
Corrected Notice of Allowability for U.S. Appl. No. 17/397,680 issued May 16, 2022. 4 pages.
First Office Action of the Korean application No. 10-2021-7027817, issued on Sep. 24, 2024. 12 pages with English translation.

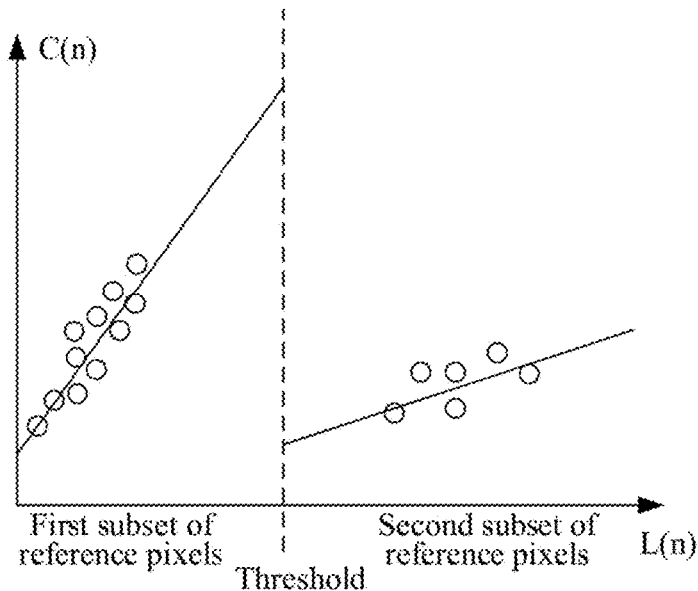

First subset of reference pixels | Threshold | Second subset of reference pixels

FIG. 6

```
┌─────────────────────────────────────────────────────────────────────┐
│ Determine a first set of reference pixels of a first colour component of a │─S701
│ current block in a picture, wherein the first set of reference pixels contains │
│                pixels adjacent to the current block                 │
└─────────────────────────────────────────────────────────────────────┘
                                   ↓
┌─────────────────────────────────────────────────────────────────────┐
│ Construct N first subsets of reference pixels using the first set of reference │
│ pixels, wherein the first subsets of reference pixels contain a part of pixels in │─S702
│ the first set of reference pixels, with N being equal to the number of prediction │
│                              models                                  │
└─────────────────────────────────────────────────────────────────────┘
                                   ↓
┌─────────────────────────────────────────────────────────────────────┐
│ Calculate model parameters of the N prediction models respectively using the │
│ N first subsets of reference pixels, wherein the prediction models are used for │
│ mapping a value of the first colour component of the current block to a │─S703
│ prediction value of a second colour component of the current block, and the │
│ second colour component is different from the first colour component │
└─────────────────────────────────────────────────────────────────────┘
```

FIG. 7

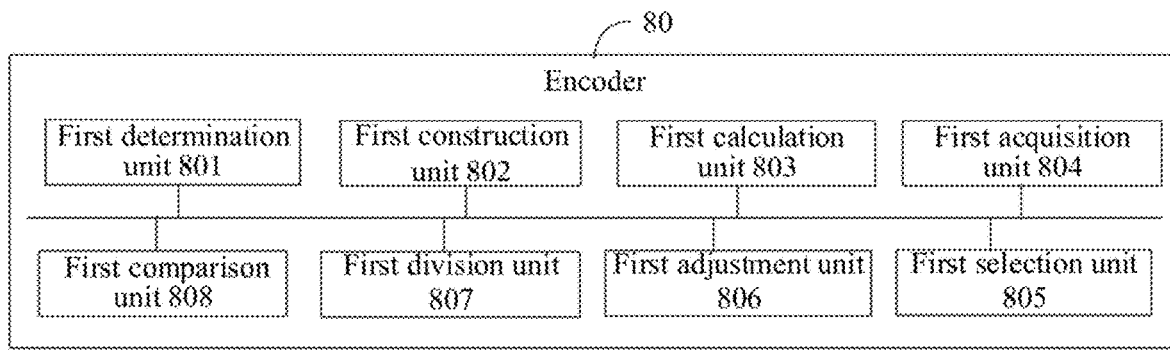

FIG. 8

COLOUR COMPONENT PREDICTION METHOD, ENCODER, DECODER AND STORAGE MEDIUM

CROSS-REFERENCE TO RELATED APPLICATIONS

This application is a continuation of U.S. application Ser. No. 17/722,082 filed on Apr. 15, 2022, which is a continuation of U.S. application Ser. No. 17/397,680 filed on Aug. 9, 2021, which is a continuation of International PCT Application No. PCT/CN2019/113771, filed on Oct. 28, 2019, which claims priority of the U.S. Application No. 62/819,851, filed on Mar. 18, 2019. The above-identified applications are hereby incorporated by reference in their entireties.

TECHNICAL FIELD

Embodiments of the present application relate to the technical field of picture processing, and more particularly, to a method for predicting colour components, an encoder, a decoder and a storage medium.

BACKGROUND

With the improvement of people's requirements for video display quality, new video application forms such as high definition and ultra high definition videos emerge as the times require. H.265/High Efficiency Video Coding (HEVC) has become unable to meet requirements of rapid development of video applications. The Joint Video Exploration Team (JVET) put forward the next generation video coding standard H.266/Versatile Video Coding (VVC), a corresponding test model of which is a VVC Test Model (VTM).

At present, a method for predicting colour components based on a prediction model has been integrated into the VTM, and a chroma component can be predicted from a luma component of a current coding block through the prediction model. However, in the process of building the prediction model, especially when the prediction model is a nonlinear model or a multi-model (which, for example, is composed of multiple linear models), the number of samples used for model parameter derivation currently is large, and the computational complexity and memory bandwidth are high; meanwhile, there may be abnormal samples in these samples, resulting in inaccurate construction of the prediction model.

SUMMARY

Embodiments of the present application provide a method for predicting colour components, an encoder, a decoder and a storage medium, such that by reducing the number of pixels in a set of adjacent reference pixels, not only can the computational complexity be reduced, but also the precision of the prediction model can be improved, so as to improve the prediction accuracy of the colour components to be processed.

Technical solutions of the embodiments of the present application may be implemented as follows.

In a first aspect, an embodiment of the present application provides a method for predicting colour components, which is applied to an encoder or a decoder, the method including: determining adjacent reference pixels of a current block in a picture; constructing a subset of adjacent reference pixels according to the adjacent reference pixels, wherein the subset of adjacent reference pixels contains a part of the adjacent reference pixels; and calculating model parameters of a prediction model according to the subset of adjacent reference pixels, wherein the prediction model includes N prediction sub-models, the N prediction sub-models correspond to N groups of model parameters, and the prediction sub-models are used to preform, through corresponding model parameters, cross-component prediction of the colour components to be predicted, and N is a positive integer greater than or equal to 2.

In a second aspect, an embodiment of the present application provides a method for predicting colour components, which is applied to an encoder or a decoder, the method including: determining a first set of reference pixels of a first colour component of a current block in a picture, wherein the first set of reference pixels contains pixels adjacent to the current block; constructing N first subsets of reference pixels using the first set of reference pixels, wherein the first subsets of reference pixels contain a part of pixels in the first set of reference pixels, and N is equal to the number of prediction models; and calculating model parameters of the N prediction models respectively using the N first subsets of reference pixels, wherein the prediction models are used for mapping a value of the first colour component of the current block to a prediction value of a second colour component of the current block, and the second colour component is different from the first colour component.

In a third aspect, an embodiment of the present application provides a encoder including a first determination unit, a first construction unit and a first calculation unit, wherein the first determination unit is configured to determine adjacent reference pixels of a current block in a picture; the first construction unit is configured to construct a subset of adjacent reference pixels according to the adjacent reference pixels, wherein the subset of adjacent reference pixels contains a part of the adjacent reference pixels; and the first calculation unit is configured to calculate model parameters of a prediction model according to the subset of adjacent reference pixels, wherein the prediction model includes N prediction sub-models, the N prediction sub-models correspond to N groups of model parameters, and the prediction sub-models are used to perform, through corresponding model parameters, cross-component prediction of colour components to be predicted, and N is a positive integer greater than or equal to 2.

In a fourth aspect, an embodiment of the present application provides an encoder including a first memory and a first processor, wherein the first memory is configured to store a computer program capable of running on the first processor; and the first processor is configured to perform the method according to the first aspect or the second aspect when running the computer program.

In a fifth aspect, an embodiment of the present application provides a decoder including a second determination unit, a second construction unit and a second calculation unit, wherein the second determination unit is configured to determine adjacent reference pixels of a current block in a picture; the second construction unit is configured to construct a subset of adjacent reference pixels according to the adjacent reference pixels, wherein the subset of adjacent reference pixels contains a part of the adjacent reference pixels; and the second calculation unit is configured to calculate model parameters of a prediction model according to the subset of adjacent reference pixels, wherein the prediction model includes N prediction sub-models, the N prediction sub-models correspond to N groups of model parameters, and the prediction sub-models are used to perform, through corresponding model parameters, cross-component prediction of colour components to be predicted, and N is a positive integer greater than or equal to 2.

In a sixth aspect, an embodiment of the present application provides a decoder including a second memory and a second processor, wherein the second memory is configured to store a computer program capable of running on the first processor; and the second processor is configured to perform the method according to the first aspect or the second aspect when running the computer program.

In a seventh aspect, an embodiment of the present application provides a computer storage medium in which a colour component prediction program is stored, wherein when the colour component prediction program is executed by the first processor or the second processor, the method according to the first aspect or the second aspect is implemented.

An embodiment of the present application provides a method for predicting colour components, an encoder, a decoder and a storage medium. The method includes: determining adjacent reference pixels of a current block in a picture; constructing a subset of adjacent reference pixels according to the adjacent reference pixels, wherein the subset of adjacent reference pixels contains a part of the adjacent reference pixels; and calculating model parameters of a prediction model according to the subset of adjacent reference pixels, wherein the prediction model includes N prediction sub-models, the N prediction sub-models correspond to N groups of model parameters, and the prediction sub-models are used to perform, through corresponding model parameters, cross-component prediction of the colour components to be predicted, and N is a positive integer greater than or equal to 2. Thus, due to screening processing of the adjacent reference pixels of the current block, unimportant reference pixels or abnormal reference pixels can be removed, so as to decrease the number of pixels in the set of adjacent reference pixels, such that there are less pixels in the subset of adjacent reference pixels, thereby not only reducing computational complexity and memory bandwidth, but also improving the precision of the prediction model. In addition, by carrying out, by at least two prediction sub-models, cross-component prediction of the colour components to be predicted, the prediction accuracy of the colour components to be processed is improved, and the prediction efficiency of video pictures is improved as well.

BRIEF DESCRIPTION OF THE DRAWINGS

FIG. 6 is a schematic diagram of grouping of adjacent reference pixels of a coding block in accordance with an embodiment of the present application.

FIG. 7 is a schematic flow chart of another method for predicting colour components in accordance with an embodiment of the present application.

FIG. 8 is a schematic diagram of a structure of an encoder in accordance with an embodiment of the present application.

DETAILED DESCRIPTION

Figure 1:
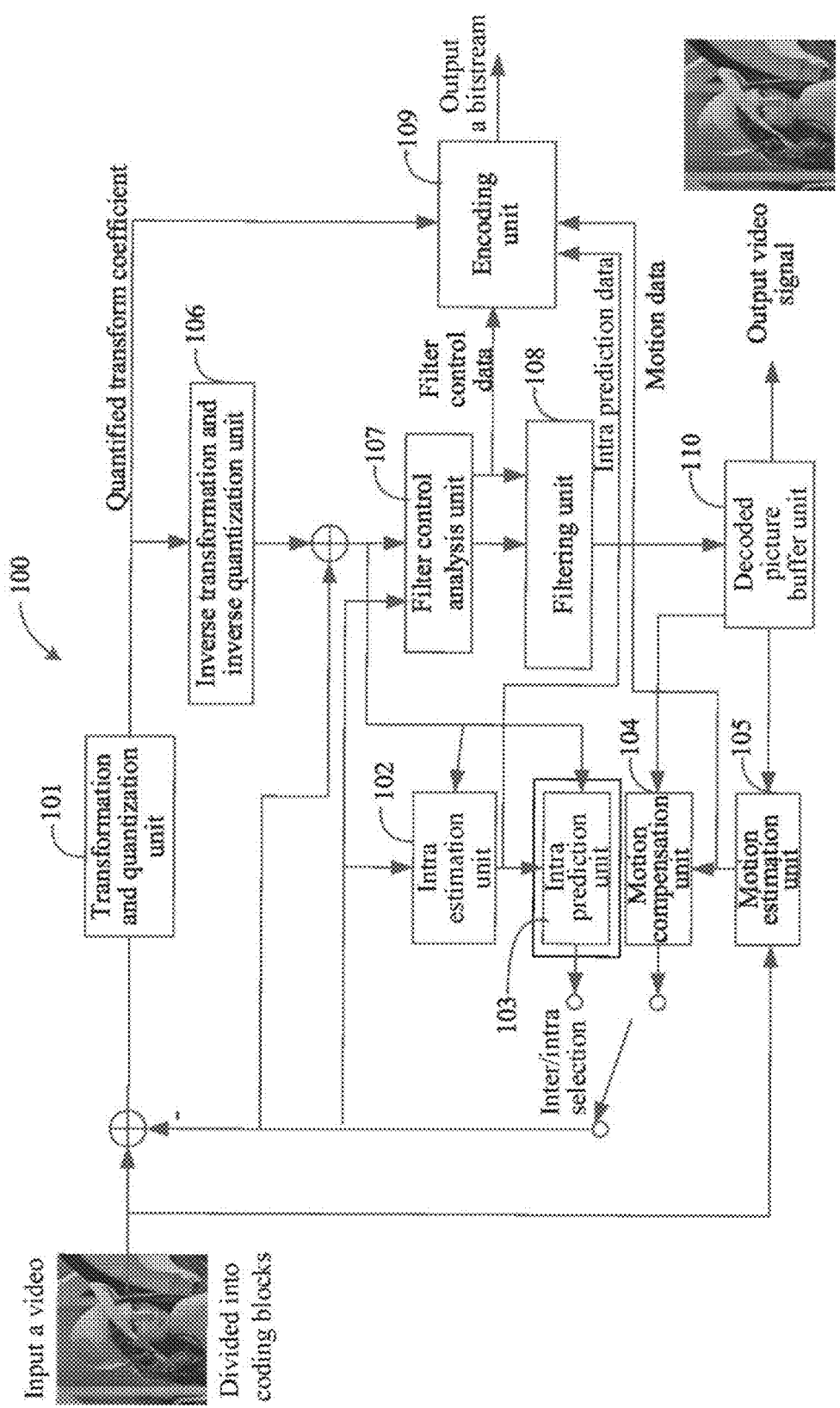
FIG. 1 is a schematic block diagram of a video encoding system in accordance with an embodiment of the present application.

In order to understand features and technical contents of embodiments of the present application in more detail, implementation modes of the embodiments of the present application will be described in detail below with reference to the accompanying drawings, which are for reference only and are not intended to limit the embodiments of the present application.

In a video picture, a coding Block (CB) is generally characterized by a first colour component, a second colour component and a third colour component. The three colour components are a luma component, a blue chroma component and a red chroma component respectively. Specifically, the luma component is usually represented by a symbol Y, the blue chroma component is usually represented by a symbol Cb or U, and the red chroma component is usually represented by a symbol Cr or V. In this way, the video picture may be expressed in a YCbCr format or a YUV format.

In an embodiment of the present application, the first colour component may be a luma component, the second colour component may be a blue chroma component, and the third colour component may be a red chroma component, which is not specifically limited in the embodiments of the present application.

In the next generation video coding standard H.266, in order to further improve coding performance and coding efficiency, cross-component linear model prediction (CCLM) is proposed to extend and improve cross-component prediction (CCP). In H.266, CCLM can implement not only prediction from the first colour component to the second colour component, but also prediction from the first colour component to the third colour component or from the third colour component to the first colour component, or even prediction from the second colour component to the third colour component or from the third colour component to the second colour component. The prediction from the first colour component to the second colour component will be described by way of example, but the technical solutions of the embodiments of the present application may also be applied to prediction of other colour components.

There are currently two prediction modes of CCLM in the VTM: one is a prediction mode of single model CCLM, the other is a prediction mode of multiple model CCLM (MMLM), which is also referred to as a prediction mode of MMLM. As the name implies, the prediction mode of single model CCLM is a prediction mode in which the prediction from the first colour component to the second colour component is implemented by only one type of prediction model, while the prediction mode of MMLM is a prediction mode in which the prediction from the first colour component to the second colour component is implemented jointly by multiple types of prediction models. For example, in the prediction mode of MMLM, sets of adjacent reference pixels may be composed of reference pixels adjacent to a coding block, and the sets of adjacent reference pixels may be divided into two groups. Each group may be used as a training set for deriving model parameters in the prediction models, that is, each group may derive a set of model parameters $\alpha$ and $\beta$.

In order to ensure the accuracy of the model parameters used by each prediction model in the prediction mode of MMLM, the set of reference pixels constructed for deriving the model parameters needs to be more accurate. Based on this, an embodiment of the present application provides a method for predicting colour components, in which by determining adjacent reference pixels of a current block in a picture, a subset of adjacent reference pixels according to the adjacent reference pixels is constructed, wherein the subset of adjacent reference pixels contains a part of the adjacent reference pixels; and then model parameters of a prediction model are calculated according to the subset of adjacent reference pixels, wherein the prediction model includes N prediction sub-models, the N prediction sub-models correspond to N groups of model parameters, and the prediction sub-models are used to carry out, through corresponding model parameters, cross-component prediction processing of colour components to be predicted, with N being a positive integer greater than or equal to 2. In this way, due to screening processing of the adjacent reference pixels of the current block, unimportant reference pixels or abnormal reference pixels can be removed, so as to decrease the number of pixels in the set of adjacent reference pixels, such that there are less pixels in the subset of adjacent reference pixels, thereby not only reducing computational complexity and memory bandwidth, but also improving precision of the prediction model. In addition, by carrying out, by at least two prediction sub-models, cross-component prediction processing of the colour components to be predicted, the prediction accuracy of the colour components to be processed is improved, and prediction efficiency of video pictures is improved as well.

Various embodiments of the present application will be described in detail below with reference to the accompanying drawings.

Referring to FIG. 1, it shows an example of a schematic block diagram of a video encoding system in accordance with an embodiment of the present application. As shown in FIG. 1, the video encoding system 100 includes: a transformation and quantization unit 101, an intra estimation unit 102, an intra prediction unit 103, a motion compensation unit 104, a motion estimation unit 105, an inverse transformation and inverse quantization unit 106, a filter control analysis unit 107, a filtering unit 108, an encoding unit 109, and a decoded picture buffer unit 110. The filtering unit 108 may implement deblocking filtering and sample adaptive offset (SAO) filtering, and the encoding unit 109 may implement header information coding and context-based adaptive binary arithmetic coding (CABAC). For an input original video signal, one video coding block may be obtained by dividing of coding tree units (CTUs), and then the residual pixel information of the video coding block obtained after intra or inter prediction is transformed by the transformation and quantization unit 101, including transforming the residual information from pixel domain to transform domain, and quantizing obtained transform coefficients, to further decrease the bit rate. The intra estimation unit 102 and the intra prediction unit 103 are configured to carry out intra prediction of the video coding block. Specifically, the intra estimation unit 102 and the intra prediction unit 103 are configured to determine an intra prediction mode to be used for encoding the video coding block. The motion compensation unit 104 and the motion estimation unit 105 are configured to carry out inter prediction coding of the received video coding block with respect to one or more blocks in one or more reference pictures to provide temporal prediction information. Motion estimation carried out by the motion estimation unit 105 is a process of generating a motion vector that can estimate motion of the video coding block, and then the motion compensation unit 104 carries out motion compensation based on the motion vector determined by the motion estimation unit 105. After determining the intra prediction mode, the intra prediction unit 103 is further configured to provide the selected intra prediction data to the encoding unit 109, and the motion estimation unit 105 also sends calculated and determined motion vector data to the encoding unit 109. In addition, the inverse transformation and inverse quantization unit 106 is configured to reconstruct the video coding block, reconstruct a residual block in the pixel domain, wherein block effect artifacts of the reconstructed residual block are removed through the filter control analysis unit 107 and the filtering unit 108, and then add the reconstructed residual block to one predictive block in a picture of the decoded picture buffer unit 110 to generate a reconstructed video coding block. The encoding unit 109 is configured to encode various coding parameters and the quantized transform coefficients. In a CABAC-based coding algorithm, context contents may be based on adjacent coding blocks, and may be used to encode information indicating the determined intra prediction mode and output a bitstream of the video signal. The decoded picture buffer unit 110 is configured to store the reconstructed video coding blocks for prediction reference. With the progress of video picture coding, new reconstructed video coding blocks will be generated continuously, and these reconstructed video coding blocks will be stored in the decoded picture buffer unit 110.

Figure 2:
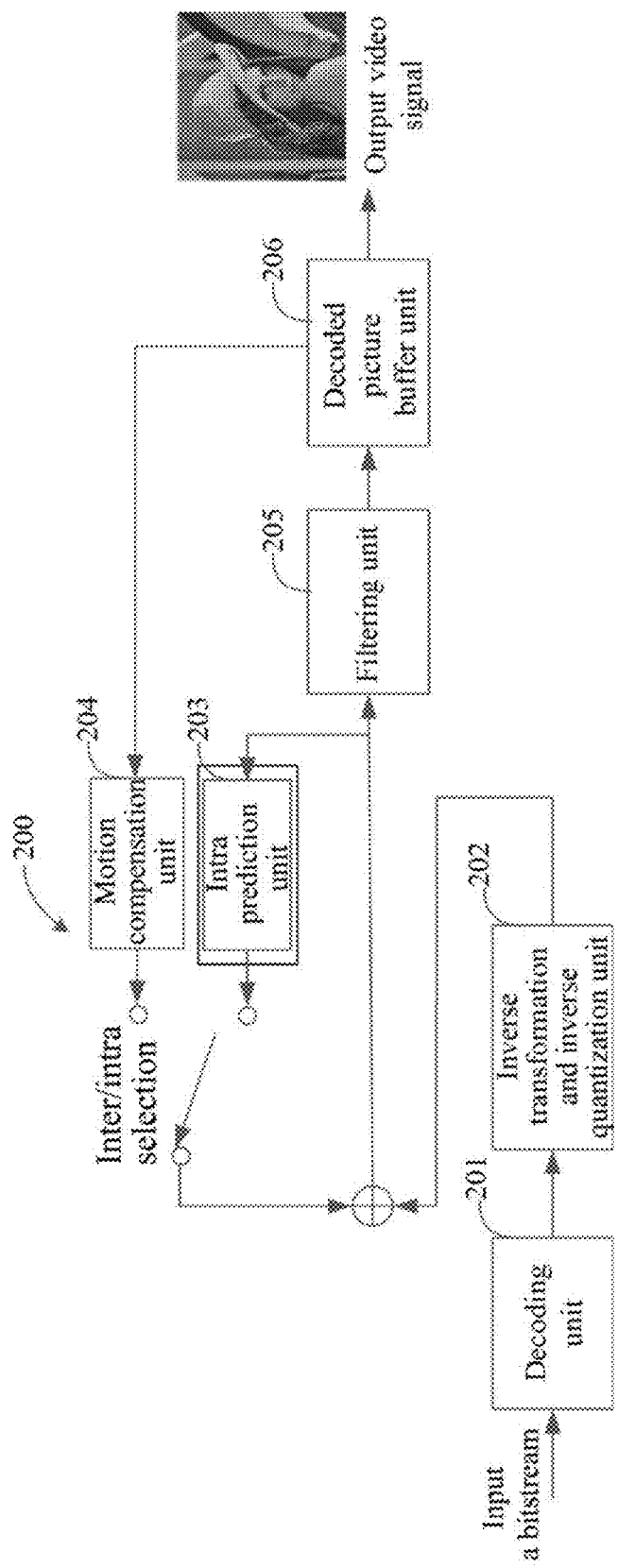
FIG. 2 is a schematic block diagram of a video decoding system in accordance with an embodiment of the present application.

Referring to FIG. 2, it shows an example of a schematic block diagram of a video decoding system in accordance with an embodiment of the present application. As shown in FIG. 2, the video decoding system 200 includes a decoding unit 201, an inverse transformation and inverse quantization unit 202, an intra prediction unit 203, a motion compensation unit 204, a filtering unit 205, and a decoded picture buffer unit 206. The decoding unit 201 may implement header information decoding and CABAC decoding, and the filtering unit 205 may implement deblocking filtering and SAO filtering. After the input video signal is processed through the encoding processing described in FIG. 1, the bitstream of the video signal is output. The bitstream is input into the video decoding system 200, and first passes through the decoding unit 201 to obtain decoded transform coefficients. The transform coefficients are processed by the inverse transformation and inverse quantization unit 202 to generate a residual block in the pixel domain. The intra prediction unit 203 may be configured to generate prediction data of the current video decoding block based on the determined intra prediction mode and data from the previous decoded blocks of the current frame or picture. The motion compensation unit 204 determines prediction information for the video decoding block by parsing motion vectors and other associated syntax elements, and uses the prediction information to generate a predictive block of the video decoding block currently being decoded. The decoded video block is generated by summing the residual block from the inverse transformation and inverse quantization unit 202 and the corresponding predictive block generated by the intra prediction unit 203 or the motion compensation unit 204. The decoded video signal passes through the filtering unit 205 to remove the block effect artifacts, so as to improve video quality. Then, the decoded video block is stored in the decoded picture buffer unit 206, wherein the decoded picture buffer unit 206 stores a reference picture used for subsequent intra prediction or motion compensation, which is also used for outputting the video signals, i.e., a restored original video signal is obtained.

The method for predicting colour components in accordance with the embodiment of the present application is mainly applied to the intra prediction unit 103 shown in FIG. 1 and the intra prediction unit 203 shown in FIG. 2, and is specifically applied to the part of CCLM prediction in intra prediction. That is to say, the method for predicting colour components in accordance with the embodiment of the present application may be applied to the video encoding system or the video decoding system, or may even be applied to the video encoding system and the video decoding system at the same time, which is not specifically limited in the embodiment of the present application. When the method is applied to the intra prediction unit 103 in the video encoding system, the "current block" specifically refers to a current coding block in the intra prediction. When the method is applied to the intra prediction unit 203 in the video decoding system, the "current block" specifically refers to a current decoding block the in intra prediction.

Figure 3:
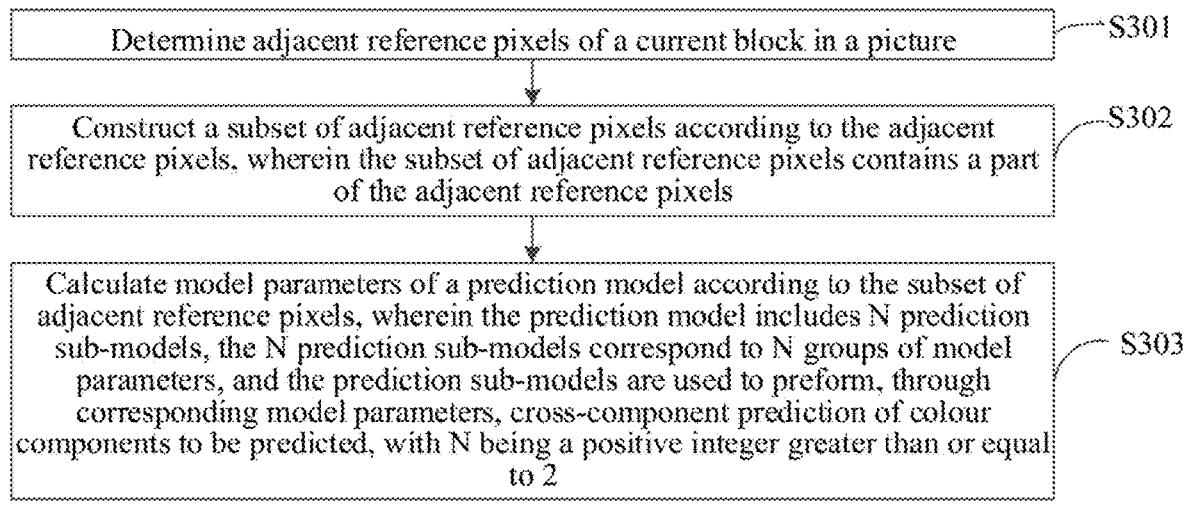
FIG. 3 is a schematic flow chart of a method for predicting colour components in accordance with an embodiment of the present application.

Based on the application scenario example in FIG. 1 or FIG. 2, referring to FIG. 3, it shows a schematic flow chart of a method for predicting colour components in accordance with an embodiment of the present application. As shown in FIG. 3, the method may include the following acts S301 to S303.

In S301, adjacent reference pixels of a current block in a picture are determined.

It should be noted that a video picture may be divided into multiple picture blocks, and each picture block to be encoded presently may be called a coding block. Each coding block may include a first colour component, a second colour component and a third colour component. The current block is a coding block in the video picture whose first colour component, second colour component or third colour component is to be predicted. When the first colour component needs to be predicted by a prediction model, the colour component to be predicted is the first colour component. When the second colour component needs to be predicted by the prediction model, the colour component to be predicted is the second colour component. When the third colour component needs to be predicted by the prediction model, the colour component to be predicted is the third colour component.

It should also be noted that when a left adjacent area, a left lower adjacent area, an upper adjacent area and a right upper adjacent area are all valid areas, the adjacent reference pixels may be composed of adjacent reference pixels in the left adjacent area and the upper adjacent area of the current block, or may also be composed of adjacent reference pixels in the left adjacent area and the left lower adjacent area of the current block, or may also be composed of adjacent reference pixels in the upper adjacent area and the right upper adjacent area of the current block, which will not specifically limited in the embodiment of the present application.

In some embodiments, optionally, as for S301, determining the adjacent reference pixels of the current block in the picture may include: acquiring reference pixels adjacent to at least one edge of the current block, wherein the at least one edge of the current block includes at least one of an upper row, a right upper row, a left column and a left lower column; and obtaining the adjacent reference pixels according to the acquired reference pixels.

It should be noted that the at least one edge of the current block may include at least one of the upper row (which may also be referred to as an upper edge), the right upper row (which may also be referred to as an right upper edge), the left column (which may also be referred to as an left edge) or the left lower column (which may also be referred to as an left lower edge).

Optionally, in some embodiments, if the at least one edge of the current block is the left edge and/or the upper edge, as for S301, determining the adjacent reference pixels of the current block in the picture may include: acquiring reference pixels adjacent to the at least one edge of the current block, wherein the at least one edge of the current block includes the left edge of the current block and/or the upper edge of the current block; and obtaining the adjacent reference pixels according to the acquired reference pixels.

It should be noted that the at least one edge of the current block may include the left edge of the current block and/or the upper edge of the current block. That is, the at least one edge of the current block may refer to the upper edge of the current block, or the left edge of the current block, or even the upper edge and the left edge of the current block, which is not specifically limited in the embodiment of the present application.

In this way, when both the left adjacent area and the upper adjacent area are valid areas, the adjacent reference pixels may be composed of reference pixels adjacent to the left edge of the current block and reference pixels adjacent to the upper edge of the current block in this case. When the left adjacent area is a valid area and the upper adjacent area is an invalid area, the adjacent reference pixels may be composed of the reference pixels adjacent to the left edge of the current block in this case. When the left adjacent area is an invalid area and the upper adjacent area is a valid area, the adjacent reference pixels may be composed of the reference pixels adjacent to the upper edge of the current block in this case.

Optionally, if the at least one edge of the current block is an adjacent column composed of the left edge and the left lower edge, and/or an adjacent row composed of the upper edge and the right upper edge, as for S301, determining the adjacent reference pixels of the current block in the picture may include: acquiring reference pixels in a reference row or a reference column adjacent to the current block, wherein the reference row is composed of rows adjacent to the upper edge and right upper edge of the current block, and the reference column is composed of columns adjacent to the left edge and left lower edge of the current block; and obtaining the adjacent reference pixels according to the acquired reference pixels.

It should be noted that the reference row adjacent to the current block may be composed of the rows adjacent to the upper edge and right upper edge of the current block, and the reference column adjacent to the current block may be composed of columns adjacent to the left edge and left lower edge of the current block. The reference row or the reference column adjacent to the current block may refer to a reference row adjacent to the upper edge of the current block, or a reference column adjacent to the left edge of the current block, or even a reference row or reference column adjacent to another edge of the current block, which is not specifically limited in the embodiment of the present application. For convenience of description, in the embodiment of the present application, the reference row adjacent to the current block will be described by taking the reference row adjacent to the upper edge as an example, and the reference column adjacent to the current block will be described by taking the reference column adjacent to the left edge as an example.

The reference pixels in the reference row adjacent to the current block may include reference pixels adjacent to the upper edge and the right upper edge (which may also be referred to as adjacent reference pixels corresponding to the upper edge and the right upper edge), wherein the upper edge represents the upper edge of the current block and the right upper edge represents an edge length of the current block extending horizontally from the upper edge to the right, which has a height as the current block. The reference pixels in the reference column adjacent to the current block may also include reference pixels adjacent to the left edge and the left lower edge (which may also be referred to as adjacent reference pixels corresponding to the left edge and the left lower edge), wherein the left edge represents the left edge of the current block and the left lower edge represents an edge length of the current block extending downward vertically from the left edge, which has the same width as the current block, which is not specifically limited in the embodiment of the present application.

Thus, when both the left adjacent area and the left lower adjacent area are valid areas, the adjacent reference pixels may be composed of reference pixels in the reference column adjacent to the current block in this case. When both the upper adjacent area and the right upper adjacent area are valid areas, the adjacent reference pixels may be composed of reference pixels in the reference row adjacent to the current block in this case.

In S302, a subset of adjacent reference pixels is constructed according to the adjacent reference pixels, wherein the subset of adjacent reference pixels contains a part of the adjacent reference pixels.

It should be noted that the adjacent reference pixels are reference pixels corresponding to the prediction model constructed in the current related technical solution. Generally, in order to prevent the video encoding system from transmitting model parameters to the video decoding system, the adjacent reference pixels may be composed of reference pixels adjacent to one or more of four edges, i.e., the upper edge, the right upper edge, the left edge and the left lower edge, of the current block, to deduce the model parameters. However, using so many reference pixels as samples for multi-model construction is complicated, and some reference pixels with abnormal values will also decrease the quality of the prediction model.

That is to say, in the adjacent reference pixels, there may be some unimportant reference pixels (for example, correlation between these reference pixels is poor) or some abnormal reference pixels. In order to ensure the accuracy of derivation of model parameters, these reference pixels need to be eliminated, thereby obtaining the subset of adjacent reference pixel. Thus, the accuracy of the prediction model can be ensured according to the subset of adjacent reference pixels, such that the prediction efficiency of the colour components to be processed is high.

The subset of adjacent reference pixels contains a preset number of reference pixels. Herein, the preset number may be N, with N being a positive integer greater than 1. In practical applications, the value of N may be 4, but the embodiment of the present application is not specifically limited thereto.

In some embodiments, as for S302, constructing the subset of adjacent reference pixels according to the adjacent reference pixels may include: determining candidate positions of candidate pixels based on the at least one edge of the current block; and selecting reference pixels corresponding to the candidate positions from the adjacent reference pixels, and composing the subset of adjacent reference pixels by the selected reference pixels.

Further, determining the candidate positions of the candidate pixels based on the at least one edge of the current block may include: determining the candidate positions based on pixel positions corresponding to reference pixels adjacent to the at least one edge of the current block.

Further, determining the candidate positions of the candidate pixels based on the at least one edge of the current block may include: determining the candidate positions based on colour component intensity values corresponding to reference pixels adjacent to the at least one edge of the current block.

Further, determining the candidate positions of the candidate pixels based on the at least one edge of the current block may include: determining the candidate positions based on pixel positions and colour component intensity values corresponding to reference pixels adjacent to the at least one edge of the current block.

It should be noted that colour component intensity may be expressed by a colour component value, such as a brightness value, a chroma value, etc. Herein, the larger the colour component value, the higher the colour component intensity. The selected reference pixels in the embodiment of the present application may be selected according to the candidate positions of the candidate pixels. The candidate positions may be determined according to the pixel positions or the colour component intensity values (such as brightness values, chroma values, etc.), which is not specifically limited in the embodiment of the present application.

In S303, model parameters of a prediction model are calculated according to the subset of adjacent reference pixels, wherein the prediction model includes N prediction sub-models, the N prediction sub-models correspond to N groups of model parameters, and the prediction sub-models are used to preform, through corresponding model parameters, cross-component prediction of the colour components to be predicted, with N being a positive integer greater than or equal to 2.

It should be noted that multiple sets of model parameters may be calculated according to the subset of adjacent reference pixels, and a prediction sub-model may be constructed according to each set of model parameters. Thus, if N groups of model parameters are calculated, then N prediction sub-models can be obtained.

It should also be noted that the prediction model may be a nonlinear model or a complex model. The complex model may be a nonlinear model in the form of nonlinear curve such as quadratic curve, or a multi-model composed of multiple linear models. Thus, for the complex model, since some unimportant reference pixels or some abnormal reference pixels have been removed from the subset of adjacent reference pixels, the N groups of model parameters determined according to the subset of adjacent reference pixels are more accurate, thereby improving the precision of the complex model and improving the prediction accuracy of colour components to be processed.

In an a method for predicting colour components provided by the embodiment, by determining adjacent reference pixels of the current block in a picture, a subset of adjacent reference pixels is constructed according to the adjacent reference pixels, wherein the subset of adjacent reference pixels contains a part of the adjacent reference pixels; and model parameters of a prediction model are calculated according to the subset of adjacent reference pixels, wherein the prediction model includes N prediction sub-models, the N prediction sub-models correspond to N groups of model parameters, and the prediction sub-models are used to carry out, through corresponding model parameters, cross-component prediction of the colour components to be predicted, with N being a positive integer greater than or equal to 2. In this way, due to screening processing of the adjacent reference pixels of the current block, unimportant reference pixels or abnormal reference pixels may be removed, so as to decrease the number of pixels in the set of adjacent reference pixels, such that there are less pixels in the subset of adjacent reference pixels, thereby not only reducing computational complexity and memory bandwidth, but also improving the precision of the prediction model. In addition, by carrying out, by at least two prediction sub-models, cross-component prediction of the colour components to be predicted, the prediction accuracy of the colour components to be processed is improved, and the prediction efficiency of video pictures is improved as well.

Further, some unimportant reference pixels or some abnormal reference pixels may be contained in the obtained adjacent reference pixels. These reference pixels will affect the calculation of the model parameters, thereby affecting the accuracy of the prediction model. At this time, a part of the reference pixels may be selected according the adjacent reference pixels to form the subset of adjacent reference pixels, and the model parameters may be calculated according to the subset of adjacent reference pixels.

It should be noted that a part of the selected reference pixels in the embodiment of the present application may be selected according to pixel positions corresponding to the reference pixels, or according to colour component intensity values (such as brightness values, chroma values, etc.) corresponding to the reference pixels, which is not specifically limited in the embodiments of the present application. The adjacent reference pixels are screened, whether according to the pixel positions corresponding to the reference pixels or the colour component intensity values corresponding to the reference pixels, to select the appropriate reference pixels to further form the subset of adjacent reference pixels. Thus, the model parameters derived from the subset of adjacent reference pixels are more accurate, so that the prediction model constructed according to the model parameters can be more accurate as well.

In some embodiments, determining the candidate positions of the candidate pixels based on the at least one edge of the current block may include: determining a preset number of candidate pixels, wherein the preset number of the candidate pixel represents the number of pixels sampled from the reference pixels adjacent to the at least one edge of the current block; and determining the candidate positions according to the preset number of the candidate pixels and a length of the at least one edge of the current block, wherein the length of the at least one edge of the current block is equal to the number of pixels contained in the at least one edge of the current block.

It should be noted that the preset number of candidate pixels represents the preset number of pixels to be sampled, that is, the number of pixels contained in the subset of adjacent reference pixels. Taking the pixel positions as an example, after the preset number of candidate pixels is determined, the candidate positions of the candidate pixels may be calculated according to the length of the at least one edge and the preset number of candidate pixels; then, appropriate reference pixels are selected from the adjacent reference pixels to form the subset of adjacent reference pixels according to the candidate positions. Thus, the model parameters calculated according to the subset of adjacent reference pixels are more accurate, thus the constructed prediction model can be more accurate, thereby improving the prediction accuracy of the colour components to be predicted and improving the prediction efficiency of video pictures.

Further, to determine the candidate positions, a first sampling interval may be calculated first, and then the at least one edge is sampled according to the first sampling interval to determine the candidate positions of the candidate pixels corresponding to the at least one edge. Therefore, in some embodiments, determining the candidate positions of the candidate pixels based on the at least one edge of the current block may include: calculating the first sampling interval according to the preset number of candidate pixels and the length of the at least one edge of the current block; and determining a reference point from the at least one edge of the current block, and determining the candidate positions according to the first sampling interval.

It should be noted that the reference point may be a midpoint of the at least one edge, or a left-center first reference pixel position of the at least one edge, or a right-center first reference pixel position of the at least one edge, or even other reference pixel positions of the at least one edge, which is not specifically limited in the embodiment of the present application.

Specifically, the midpoint of the at least one edge may be determined according to the length of the at least one edge, and then the midpoint of the at least one edge may be used as the reference point. The reference point may be the midpoint of the at least one edge, or the left-center first reference pixel position of the at least one edge, or the right-center first reference pixel position of the at least one edge, or even other reference pixel positions of the at least one edge, which is not specifically limited in the embodiment of the present application.

It should be noted that, considering that the importance of the reference pixels adjacent to the at least one edge of the current block is related to their corresponding positions, in order to enable the reference pixels in the subset of adjacent reference pixels to represent characteristics of the whole adjacent edge, the reference pixels at the center position of the edge need to be selected to one's best, so as to eliminate points with low importance (such as reference pixels at two sides of the edge). In the embodiment of the present application, if the upper edge of the current block is described by way of example, the right-center or left-center first reference pixel position may be used as the reference point of this edge; if the left edge of the current block is described by way of example, the lower-center or upper-center first reference pixel position may be used as the reference point of this edge.

In addition, before the reference point is determined, the preset number of reference pixels corresponding to an end position of one edge of the current block may be deleted first, or for the edge, the reference pixels may be initially offset from the end position according to a preset offset, the offset reference pixel position is used as a starting point to obtain a new edge, and then a middle position corresponding to the new edge is used as the reference point. Accordingly, the preset number of reference pixels corresponding to a start position of one edge of the current block may be deleted first, or for the edge, the reference pixels may be initially offset from the start position according to a preset offset, the offset reference pixel position is used as a starting point to obtain a new edge, and then a middle position corresponding to the new edge is used as the reference point.

Figure 4:
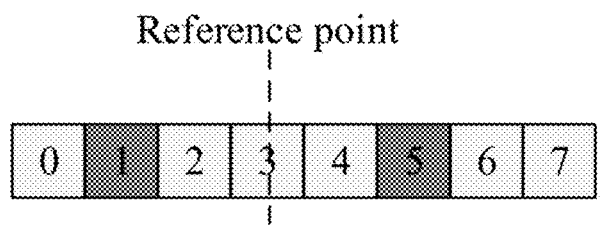
FIG. 4 is a schematic structural diagram of a selected subset of adjacent reference pixels on an upper edge of a current block in accordance with an embodiment of the present application.
Figure 5:
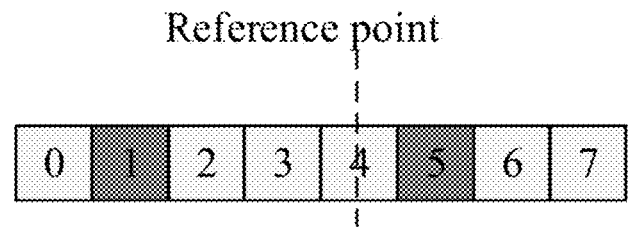
FIG. 5 is a schematic structural diagram of another selected subset of adjacent reference pixels on the upper edge of the current block in accordance with an embodiment of the present application.

In practical applications, because the length of the left edge or the upper edge of the current block is an integer multiple of 2, the middle position of the left edge or the upper edge of the current block is between two points. In the example of FIG. 4, a first pixel at a left-center position is used as a midpoint of the edge; however, in the embodiment of the present application, a first pixel at a right-center position is used as a midpoint of the edge, as shown in FIG. 5. In FIG. 4, the first pixel (e.g., 3 in FIG. 4) at the left-center position is used as the midpoint of the edge. Since the preset number of samples is 2, positions (e.g., gray points in FIG. 4) of the reference pixels to be selected may be determined to be 1 and 5. Reference pixels corresponding to these reference pixels may be selected according to these reference pixel positions, to form the subset of adjacent reference pixels. Therefore, in the embodiment of the present application, for the upper edge of the current block, a first pixel at a right-center position may be used as a midpoint of the edge, and a first pixel at a right-center position may also be used as a midpoint of the edge, which is not specifically limited in the embodiment of the present application. In addition, for the left edge of the current block, a first pixel at a lower-center position may be used as a midpoint of the edge, and a first pixel at a upper-center position may also be used as a midpoint of the edge, which is not specifically limited in the embodiment of the present application.

Unless otherwise specified, the upper edge of the current block will be described below by way of example, but the method for predicting colour components in accordance with the embodiment of the present application is also applied to the left edge of the current block, or even the right edge of the reconstructed block or the lower edge of the reconstructed block, which is not specifically limited in the embodiment of the present application.

It may be understood that if the existence of the reference pixels adjacent to the left edge or the upper edge of the current block is not considered, a second set of reference pixels may also be constructed according to formula (1) and formula (2):

$$\Delta = \text{length}/(N_2/2) \quad (1)$$

$$\text{shift} = \Delta/2 \quad (2)$$

wherein $\Delta$ represents a sampling interval, length represents the number of reference pixels in a row adjacent to the upper edge of the current block or the number of reference pixels in a column adjacent to the left edge of the current block, $N_2$ represents the expected number of reference pixels forming the subset of adjacent reference pixels of the current block (generally speaking, the left edge and the upper edge each corresponds to a half of the reference pixels, but the embodiment of the present application is not specifically limited thereto), and shift represents a starting point position of a selected reference pixel. Herein, when the middle position of the left edge or the upper edge of the current block is between two points, if the first pixel at the right-center position is used as the midpoint of the edge, then the starting point position shift=$\Delta/2$, at which point if the first pixel at the left-center position is used as the midpoint of the edge, then the starting point position shift=$\Delta/2-1$.

Illustratively, taking the upper edge shown in FIG. 4 as an example, length is equal to 8 and $N_2$ is equal to 4. Assuming that the left edge and the upper edge each corresponds to a half of the reference pixels, that is, the preset number of samples of the upper edge is 2, $\Delta=\text{length}/(N_2/2)=4$ and shift=$\Delta/2=2$ are calculated according to formula (1) and formula (2) respectively. That is, positions of the selected reference pixels, for example, 1 and 5 may be determined by using 1 as the starting point position and 4 as the sampling interval, to further select the corresponding reference pixels to form the subset of adjacent reference pixels. Herein, it should be noted that the value of the preset number of samples corresponding to the left edge may be the same as or different from the value of the preset number of samples corresponding to the upper edge, which is not specifically limited in the embodiment of the present application.

It should also be noted that the first sampling interval corresponding to an edge of the current block may be calculated according to the preset number of candidate pixels and the length of the edge. In addition, if the length of the left edge or the upper edge of the current block is an integer multiple of 2, the middle position of the left edge or the upper edge of the current block is between two points, at which point the calculated midpoint value is a non-integer and the calculated reference pixel position is also a non-integer; while if the length of the left edge or the upper edge of the current block is not an integer multiple of 2, the middle position of the left edge or the upper edge of the current block is between two points, at which point the calculated midpoint value is an integer and the calculated reference pixel position is also an integer; accordingly, the calculated reference pixel position may also be an integer or a non-integer, which is not specifically limited in the embodiment of the present application.

Thus, when the calculated midpoint value is an integer, the calculated reference pixel position is also an integer accordingly, at which point the calculated reference pixel position may be used as candidate positions directly; when the calculated midpoint value is a non-integer, the calculated reference pixel position is also a non-integer accordingly, at which point the candidate positions may be determined by rounding the calculated reference pixel position up or down to the nearest integer.

Further, in some embodiments, after the first sampling interval is calculated, the method may further includes: adjusting the first sampling interval to obtain a second sampling interval; and determining the candidate positions according to the second sampling interval based on the reference point.

It should be noted that after the first sampling interval is calculated, the first sampling interval may also be adjusted finely, for example, 1 is added to or subtracted from the first sampling interval to obtain the second sampling interval. For example, if the first sampling interval is 4, the adjusted second sampling interval may be 3 or 5. In the embodiment of the present application, minor adjustment may be made to the first sampling interval, but the specific setting for the amplitude of the adjustment in not specifically limited in the embodiment of the present application.

Further, in some embodiments, after the first sampling interval is calculated, the method may further includes: based on the reference point, determining the candidate positions corresponding to one side of the reference point according to the first sampling interval, and determining the candidate positions corresponding to the other side of the reference point according to the second sampling interval.

That is to say, after the reference point of the at least one edge of the current block is determined, uniform sampling may be carried out according to the first sampling interval or the second sampling interval; non-uniform sampling may also be carried out according to the first sampling interval and the second sampling interval, and the candidate positions determined after sampling may be symmetrically distributed at two sides of the reference point or asymmetrically distributed at the two sides of the reference point; which in not specifically limited in the embodiment of the present application.

Further, since reference pixels located in the middle position of at least one edge are associated with the colour components to be predicted of the current block in the adjacent reference pixels, the reference pixel positions of the preset number of continuous samples near the middle position may be used as reference pixel positions to be selected, so such method may be referred to as a middle position continuous point sampling scheme. Specifically, assuming that the reference pixel positions in a row/column adjacent to the upper edge or left edge of the current block are numbered from 0, the number of adjacent reference pixels forming the subset of adjacent reference pixels and the corresponding reference pixel positions to be selected in the present embodiment are shown in table 1. At this time, the reference pixel positions of the preset number of continuous samples near the middle position may be used as candidate positions, to form the subset of adjacent reference pixels.

TABLE 1

| Length of at least one edge of the current block | Candidate position | Preset number of candidate pixels |
| --- | --- | --- |
| 2 | 0, 1 | 2 |
| 4 | 1, 2 | 2 |
| 8 | 2, 3, 4 (or 3, 4, 5) | 3 |
| 16 | 6, 7, 8, 9 | 4 |
| 32 | 13, 14, 15, 16, 17, 18, 19, 20 | 8 |

Further, for screening of the adjacent reference pixels, the reference pixels of the at least one edge may also be skipped, that is, unimportant reference pixels or abnormal reference pixels may be skipped (which may also be regarded as deletion processing), so as to obtain the subset of adjacent reference pixels. Also, based on this, after a part of the reference pixels of the at least one edge are skipped, the remaining reference pixels are screened to obtain the subset of adjacent reference pixels. Therefore, in some embodiments, determining the candidate positions of the candidate pixels based on the at least one edge of the current block may include: determining the preset number K of skipped pixels corresponding to the at least one edge of the current block, wherein K is a positive integer greater than or equal to 1; determining positions corresponding to the K pixels to be skipped starting from a start position and/or an end position of the at least one edge of the current block; skipping continuously the K pixels to be skipped from the start position and/or the end position of the at least one edge of the current block based on the positions corresponding to the K pixels to be skipped to obtain at least one new edge of the current block; and determining the candidate positions based on the at least one new edge of the current block and the preset number of candidate pixels.

It should be noted that the preset number of skipped pixels represents the preset number of pixels to be deleted or skipped. In addition, the start position of the at least one edge represents the leftmost edge position of the upper edge of the current block or the uppermost edge position of the left edge of the current block, and the end position of the at least one edge represents the rightmost edge position of the upper edge of the current block or the lowermost edge position of the left edge of the current block.

It should also be noted that the value of K may be the preset number of reference pixels, such as 1, 2 or 4, or may also be calculated according to the length of the current block and its corresponding preset ratio. However, in practical applications, it is still set according to the actual situations, which is not specifically limited in the embodiment of the present application. The preset ratio corresponding to the upper edge of the current block may be represented by a first preset ratio, and the preset ratio corresponding to the left edge of the current block may be represented by a second preset ratio. The value of the first preset ratio may be the same as or be different from the second preset ratio, which is not specifically limited in the embodiment of the present application.

Thus, assuming that starting from the start position of the at least one edge, if the at least one edge is the upper edge of the current block (which may also be referred to as a reference row of the current block), then the positions corresponding to the K pixels to be skipped may be determined starting from the leftmost edge position of the at least one edge; if the at least one edge is the left edge of the current block (which may also be referred to as a reference column of the current block), then the positions corresponding to the K pixels to be skipped may be determined starting from the uppermost edge position of the at least one edge; assuming that starting from the end position of the at least one edge, if the at least one edge is the upper edge of the current block, then the positions corresponding to the K pixels to be skipped may be determined starting from the rightmost edge position of the at least one edge; if the at least one edge is the left edge of the current block, then the positions corresponding to the K pixels to be skipped may be determined starting from the lowermost edge position of the at least one edge. In practical applications, it is set according to the actual situations, which is not specifically limited in the embodiment of the present application.

After the positions corresponding to the K pixels to be skipped are determined, assuming that starting from the start position of the at least one edge, if the at least one edge is the upper edge of the current block, then starting from the leftmost edge position of the upper edge, positions corresponding to the K consecutive pixels to be skipped may be determined to the right, and then these K pixels to be skipped continuously to obtain a new upper edge, at which point candidate positions corresponding to the new upper edge may be determined according to the length of the new upper edge and the preset number of candidate pixels, so as to compose the selected candidate pixels into the subset of adjacent reference pixels; if the at least one edge is the left edge of the current block, then starting from the uppermost edge position of the left edge, positions corresponding to the K consecutive pixels to be skipped may be determined downward, and then these K pixels to be skipped continuously to obtain a new left edge, at which point candidate positions corresponding to the new left edge may be determined according to the length of the new left edge and the preset number of candidate pixels, so as to compose the selected candidate pixels into the subset of adjacent reference pixels. Alternatively, assuming that starting from the end position of the at least one edge, if the at least one edge is the upper edge of the current block, then starting from the rightmost edge position of the upper edge, positions corresponding to the K consecutive pixels to be skipped may be determined to the left, and then these K pixels to be skipped continuously to obtain a new upper edge, at which point candidate positions corresponding to the new upper edge may be determined according to the length of the new upper edge and the preset number of candidate pixels, so as to compose the selected candidate pixels into the subset of adjacent reference pixels; if the at least one edge is the left edge of the current block, then starting from the lowermost edge position of the left edge, positions corresponding to the K consecutive pixels to be skipped may be determined upward, and then these K pixels to be skipped continuously to obtain a new left edge, at which point candidate positions corresponding to the new left edge may be determined according to the length of the new left edge and the preset number of candidate pixels, so as to compose the selected candidate pixels into the subset of adjacent reference pixels.

Thus, in the embodiment of the present application, the model parameters corresponding to a complex model (such as a nonlinear model or multi-model) are derived using a part of adjacent reference pixels (i.e., the subset of adjacent reference pixels) obtained from the adjacent reference pixels of the current block. Since unimportant reference pixels or abnormal reference pixels have been eliminated from the obtained subset (i.e., the subset of adjacent reference pixels), there are less reference pixels in the subset, such that not only the computational complexity and memory bandwidth is reduced, but also the accuracy of the complex model is improved, thereby achieving the purpose of improving the prediction accuracy of the colour components to be processed and the prediction efficiency of video pictures.

Further, after the subset of adjacent reference pixels is determined, the model parameters of the prediction model may be calculated according to the subset of adjacent reference pixels to construct the prediction model. The prediction model may include N prediction sub-models, N being a positive integer greater than or equal to 2. Therefore, in some embodiments, as for S303, calculating the model parameters of the prediction model according to the subset of adjacent reference pixels may include: constructing N first subsets of adjacent reference pixels according to the subset of adjacent reference pixels; and calculating N groups of model parameters corresponding to the N prediction sub-models based on the N first subsets of adjacent reference pixels, wherein each of the prediction sub-models corresponds to a set of model parameters.

Further, constructing the N first subsets of adjacent reference pixels according to the subset of adjacent reference pixels may include: determining at least one threshold according to the subset of adjacent reference pixels; and dividing the subset of adjacent reference pixels into the N first subsets of adjacent reference pixels according to the at least one threshold.

It should be noted that the threshold is the basis for classifying the reference pixels contained in the subset of adjacent reference pixels, and is also the basis for classifying first colour component reconstruction values of the current block. In addition, the threshold is also used for indicating a set value on which establishment of a plurality of prediction sub-models are based, and the size of the threshold is related to the first colour component reconstruction values corresponding to all pixels in the current block.

Specifically, the size of the threshold may be obtained by calculating a mean value of the first colour component reconstruction values corresponding to all pixels in the current block, or by calculating a median value of the first colour component reconstruction values corresponding to all pixels in the current block, which is not specifically limited in the embodiment of the present application.

In the embodiment of the present application, first, the mean value Mean may be calculated according to the first colour component reconstruction values corresponding to all pixels in the current block and formula (3):

$$\text{Mean} = \frac{\sum Rec_L[i, j]}{M} \qquad (3)$$

wherein Mean represents a mean value of reconstruction luma values corresponding to all pixels in the current block, $\Sigma Rec_L[i,j]$ represents the sum of the reconstruction luma values corresponding to all pixels in the current block, and M represents the number of samples of the reconstruction luma values corresponding to all pixels in the current block.

Secondly, the calculated mean value Mean is used as the threshold directly, and the second set of reference pixels may be divided into two groups using the threshold, so as to establish two prediction sub-models, but the embodiment of the present application is not limited thereto.

Thus, after the mean value Mean is calculated according to the first colour component reconstruction values corresponding to all pixels in the current block, if two prediction sub-models need to be established, Mean may be used as the threshold directly, and the reference pixels in the subset of adjacent reference pixels may be divided into two groups according to the threshold, indicating that the two prediction sub-models may be established subsequently. If three prediction sub-models need to be established, then (a first colour component minimum reconstruction value+Mean+1)>>1 may be used as a first threshold, and (the first colour component maximum reconstruction value+Mean+1)>>1 may be used as a second threshold. The reference pixels in the second set of reference pixels may be divided into three groups according to the two thresholds, indicating that the three prediction sub-models may be established subsequently.

Further, in some embodiments, after the model parameters of the prediction model are calculated according to the subset of adjacent reference pixels, the method may further include: determining a first colour component reconstruction value corresponding to each pixel in the current block; selecting one prediction sub-model from the N prediction sub-models; and calculating a second colour component prediction value corresponding to each pixel in the current block according to the selected prediction sub-model and the first colour component reconstruction value corresponding to each pixel in the current block, wherein the colour component to be predicted is a second colour component.

Further, selecting one prediction sub-model from the N prediction sub-models may include: comparing the first colour component reconstruction value corresponding to each pixel in the current block with the at least one threshold; and selecting the prediction sub-model corresponding to each pixel in the current block from the N prediction sub-models according to a result of the comparison.

It should be noted that at least two subsets of reference pixels may be obtained by grouping the subset of adjacent reference pixels according to the at least one threshold, and then at least two sets of model parameters may be determined. Specifically, the mean value Mean may be used as the threshold directly, and then a first colour component adjacent reference value corresponding to each reference pixel in the subset of adjacent reference pixels is compared with Mean, for example, first colour component adjacent reference values greater than Mean form a first subset of first colour component adjacent reference values less than Mean form a second subset of reference pixels, to obtain two groups of subsets of reference pixels; a first set of model parameters α1 and β1 are determined according to the reference pixels in the first subset of reference pixels; and a second set of model parameters α2 and β2 are determined according to the reference pixels in the second subset of reference pixels.

It should also be noted that after at least two prediction sub-models are established, the first colour component reconstruction value corresponding to each pixel in the current block may be compared with the at least one threshold, and a prediction sub-model corresponding to each pixel may be selected from the at least two prediction sub-models according to a result of the comparison. Then, the colour components to be predicted are predicted according to the selected prediction sub-models, so as to obtain prediction values of the colour components to be predicted.

Illustratively, assuming that the first colour component adjacent reference values corresponding to the reference pixels adjacent to the current block are represented by L(n), second colour component adjacent reference values corresponding to the reference pixels adjacent to the current block are represented by C(n), and the threshold is represented by Threshold. Referring to FIG. 6, which shows a schematic diagram of grouping of adjacent reference pixels of the current block in accordance with an embodiment of the present application. In FIG. 6, all reference pixels adjacent to the current block may be divided into two portions, for example, the first subset of reference pixels and the second subset of reference pixels, with the threshold as a demarcation point. The mean value Mean of the first colour component reconstruction values of all pixels in the current block is used as the threshold, that is, Threshold=Mean. Thus, if L(n)≤Threshold, the reference pixels corresponding to L(n) may be determined as the first subset of reference pixels, to further obtain first colour component adjacent reference values L(m) and second colour component adjacent reference values C(m) corresponding to all reference pixels in the first subset of reference pixels; if L(n)>Threshold, the reference pixels corresponding to L(n) may be determined as the second subset of reference pixels, to further obtain first colour component adjacent reference values L(k) and second colour component adjacent reference values C(k) corresponding to all reference pixels in the second subset of reference pixels.

Thus, after the first colour component adjacent reference values L(m) and the second colour component adjacent reference values C(m) corresponding to all reference pixels in the first subset of reference pixels are obtained, they may be used as separate training sets, thereby training the first set of model parameters α1 and β1; after the first colour component adjacent reference values L(k) and the second colour component adjacent reference values C(k) corresponding to all reference pixels in the second subset of reference pixels are obtained, they may be used as separate training sets, thereby training the second set of model parameters α2 and β2. Specifically, the first set of model parameters α1 and β1 are calculated according to L(m), C(m) and formula (4), as shown below:

$$\begin{cases} \alpha1 = \dfrac{M \cdot \sum (L(m) \cdot C(m)) - \sum L(m) \cdot \sum C(m)}{M \cdot \sum (L(m) \cdot L(m)) - \sum L(m) \cdot \sum L(m)} \\ \beta1 = \dfrac{\sum C(m) - \alpha1 \cdot \sum L(m)}{M} \end{cases} \quad (4)$$

The second set of model parameters α2 and β2 are calculated according to L(k), C(k) and formula (5), as shown below:

$$\begin{cases} \alpha2 = \dfrac{K \cdot \sum (L(k) \cdot C(k)) - \sum L(k) \cdot \sum C(k)}{K \cdot \sum (L(k) \cdot L(k)) - \sum L(k) \cdot \sum L(k)} \\ \beta2 = \dfrac{\sum C(k) - \alpha2 \cdot \sum L(k)}{K} \end{cases} \quad (5)$$

After the first set of model parameters α1 and β1 and the second set of model parameters α2 and β2 are obtained respectively, a first prediction sub-model $Pred_{1C}[i,j]$ and a second prediction sub-model $Pred_{2C}[i,j]$ may also be established according to formula (6), as shown below:

$$\begin{cases} Pred_{1C}[i, j] = \alpha1 \times Rec_L[i, j] + \beta1, & \text{if } Rec_L[i, j] \le \text{Threshold} \\ Pred_{2C}[i, j] = \alpha2 \times Rec_L[i, j] + \beta2, & \text{if } Rec_L[i, j] > \text{Threshold} \end{cases} \quad (6)$$

wherein M represents the number of reference pixels in the first subset of reference pixels, K represents the number of reference pixels in the second subset of reference pixels, i and j represent a position coordinate of each pixel in the current block, i represents the horizontal direction and j represents the vertical direction; Threshold represents a threshold, which may be obtained by averaging the first colour component reconstruction values corresponding to all pixels in the current block; $Rec_L[i,j]$ represents a first colour component reconstruction value corresponding to a pixel with the position coordinate of [i, j] in the current block; $Pred_{1C}[i,j]$ represents a second colour component prediction value of the pixel with the position coordinate of [i, j] in the current block obtained using the first prediction sub-model, and $Pred_{2C}[i,j]$ represents a second colour component prediction value of the pixel with the position coordinate of [i, j] in the current block obtained using the second prediction sub-model.

Specifically, for a complex model (which includes two or more linear models, for example), the colour components to be predicted may be predicted using the prediction mode of MMLM. For the current block, pairs of prediction sub-models corresponding to different model parameters may be selected for pixels with different position coordinates to construct prediction values. For example, assuming that there are two linear models, and there are two pixels m and n in the current block. The two pixels have two different luma reconstruction values, which are between two different intervals.

Thus, a chroma prediction value may be obtained for the pixel m using a prediction model shown in equation (7):

$$C'_m = \alpha1 \times Y_m + \beta1 \quad (7)$$

wherein α1 and β1 are a set of model parameters, $Y_m$ is a luma reconstruction value corresponding to the pixel m, and $C'_m$ is a chroma prediction value corresponding to the pixel m.

A chroma prediction value may be obtained for the pixel n using a prediction model shown in equation (8):

$$C'_n = \alpha 2 \times Y_n + \beta 2 \qquad (8)$$

wherein α2 and β2 are a set of model parameters, $Y_n$ is a luma reconstruction value corresponding to the pixel n, and $C'_n$ is a chroma prediction value corresponding to the pixel n.

In addition, in the embodiments of the present application, more complex prediction models (such as more complex nonlinear models or more complex multi-models) may also be constructed for the purpose of implementing cross-component prediction or cross-component prediction, for example, chroma values may be predicted according to the obtained luma reconstruction values, or luma values may be predicted according to the obtained chroma reconstruction values, or even different chroma values may be predicted.

The present embodiment provides a method for predicting colour components, and the specific implementation of the previous embodiments is described in detail. It can be seen, through the technical schemes of the previous embodiments, due to screening processing of the adjacent reference pixels of the current block, unimportant reference pixels or abnormal reference pixels can be removed, so as to decrease the number of samples required for derivation of the model parameters in cross-component prediction, such that not only the computational complexity and memory bandwidth is reduced, but also the prediction model is optimized, improving the accuracy of the prediction model. In addition, in the present application, the derivation process of the model parameters in the complex model (nonlinear model or multi-model) is mainly optimized, to implement, using at least two prediction sub-models, the prediction of the colour components to be predicted, thereby improving the prediction accuracy of the colour components to be predicted and improving the prediction efficiency of video pictures.

Referring to FIG. 7, which shows is a schematic flow chart of another method for predicting colour components in accordance with an embodiment of the present application. As shown in FIG. 7, the method may include the following acts.

In S701, a first set of reference pixels of a first colour component of the current block in a picture is determined, wherein the first set of reference pixels contains adjacent pixels in the current block.

In S702, N first subsets of reference pixels are constructed using a first set of reference pixels, wherein the first subsets of reference pixels contain a part of pixels in the first set of reference pixels, N being equal to the number of prediction models.

In S703, model parameters of the N prediction models are calculated respectively using the N first subsets of reference pixels, wherein the prediction models are used for mapping a value of the first colour component of the current block to a prediction value of a second colour component of the current block, the second colour component being different from the first colour component.

It should be noted that a video picture may be divided into a plurality of picture blocks, and each picture block to be encoded presently may be called a coding block. Each coding block may include a first colour component, a second colour component and a third colour component. The current block is a coding block in the video picture by which the first colour component, the second colour component or the third colour component are to be predicted. When the first colour component needs to be predicted by a prediction model, the colour component to be predicted is the first colour component; when the second colour component needs to be predicted by the prediction model, the colour component to be predicted is the second colour component; when the third colour component needs to be predicted by the prediction model, the colour component to be predicted is the third colour component. In the embodiment of the present application, the colour component to be predicted is described by taking the second colour component as an example, and the value of the first colour component of the current block may be mapped to the prediction value of the second colour component of the current block through the prediction model.

It should also be noted that the prediction model may be a nonlinear model or a complex model. The complex model may be a nonlinear model in the form of nonlinear curve such as quadratic curve, or a multi-model composed of multiple linear models. Thus, for the complex model, since there may be some unimportant reference pixels (for example, correlation of these reference pixels is poor) or some abnormal reference pixels in the subset of adjacent reference pixels, in order to ensure the accuracy of derivation of the model parameter, these reference pixels need to be eliminated to construct the subset of reference pixels, so that the model parameters determined according to the subset of reference pixels are more accurate, thereby not only improving the precision of the complex model, but also improving the prediction accuracy of the colour components to be processed.

In a method for predicting colour components provided by the present application, by determining a first set of reference pixels corresponding to a first colour component of the current block in a picture, wherein the first set of reference pixels contains adjacent pixels in the current block; constructing N first subsets of reference pixels using a first set of reference pixels, wherein the first subsets of reference pixels contain a part of pixels in the set of first reference pixels, N being equal to the number of prediction models; and calculating model parameters of the N prediction models respectively using the N first subsets of reference pixels, wherein the prediction models are used for mapping a value of the first colour component of the current block to a prediction value of a second colour component of the current block, the second colour component being different from the first colour component; in this way, due to screening processing of the adjacent reference pixels of the current block, unimportant reference pixels or abnormal reference pixels can be removed, so as to decrease the number of pixels in the set of adjacent reference pixels, such that there are less pixels in the subset of adjacent reference pixels, thereby not only reducing computational complexity and memory bandwidth, but also improving the precision of the prediction model. In addition, cross-prediction prediction of the colour components to be processed is carried out through at least two prediction sub-models, thereby improving the prediction accuracy of the colour components to be processed and improving the prediction efficiency of video pictures.

Further, in some embodiments, as for S702, constructing the N first subsets of reference pixels using the first set of reference pixels may include: determining at least one threshold according to the first set of reference pixels; and dividing the first set of reference pixels into the N first subsets of reference pixels according to the at least one threshold.

It should be noted that the value of N is a positive integer greater than or equal to 2.

It should also be noted that the threshold is the basis for classifying the reference pixels contained in the subset of adjacent reference pixels, and is also the basis for classifying first colour component reconstruction values of the current block. In addition, the threshold is also used for indicating a set value on which establishment of a plurality of prediction sub-models are based, and the size of the threshold is related to the first colour component reconstruction values corresponding to all pixels in the current block. Specifically, the size of the threshold may be obtained by calculating a mean value of the first colour component reconstruction values corresponding to all pixels in the current block, or by calculating a median value of the first colour component reconstruction values corresponding to all pixels in the current block, which is not specifically limited in the embodiment of the present application.

In some embodiments, as for S701, determining the first set of reference pixels of the first colour component of the current block in the picture may include: obtaining the first set of reference pixels according to a part or all of pixels on an edge of the current block, wherein the edge of the current block includes at least one of an upper adjacent row, a right upper adjacent row, a left adjacent column and a left lower adjacent column.

It should be noted that at least one edge of the current block may include at least one of the upper row (which may also be referred to as an upper edge), the right upper row (which may also be referred to as an right upper edge), the left column (which may also be referred to as an left edge) or the left lower column (which may also be referred to as an left lower edge). Some or all pixels on these edges of the current block may form the first set of reference pixels.

Further, because there may be some unimportant reference pixels (for example, correlation of these reference pixels is poor) or some abnormal reference pixels in the adjacent reference pixels of the current block, the adjacent reference pixels need to be screened, and the screened candidate pixels form the first set of reference pixels. Therefore, in some embodiments, obtaining the first set of reference pixels according to a part or all of the pixels on the edge of the current block may include: determining candidate positions of the candidate pixels on the edge of the current block; and obtaining the first set of reference pixels according to the pixels at the candidate positions.

Further, determining the candidate positions of the candidate pixels on the edge of the current block may include: determining the candidate positions according to pixel positions corresponding to the pixels on the edge of the current block.

Further, determining the candidate positions of the candidate pixels on the edge of the current block may include: determining the candidate positions according to first colour component values corresponding to the pixels on the edge of the current block.

Further, determining the candidate positions of the candidate pixels on the edge of the current block may include: determining the candidate positions according to the pixel positions corresponding to the pixels on the edge of the current block and the first colour component values corresponding to the pixels on the edge of the current block.

It should be noted that the first colour component values are mainly used for characterizing the colour component intensity, such as luma values, chroma values, etc., of the pixels. Herein, the larger the colour component value, the higher the colour component intensity.

It should also be noted that in the embodiment of the present application, the reference pixels may be selected according the candidate positions of the candidate pixels. The candidate positions may be determined according to the pixel positions, or the first colour component values (such as luma values, chroma values, etc.), or both the pixel positions and the first colour component values, which is not specifically limited in the embodiment of the present application. That is to say, in the embodiment of the present application, a part of the reference pixels may be selected according to the pixel positions corresponding to the reference pixels, or according to colour component intensity values (such as luma values, chroma values, etc.) corresponding to the reference pixels. The adjacent reference pixels are screened, whether according to the pixel positions corresponding to the reference pixels or according to the colour component intensity values corresponding to the reference pixels, to select appropriate reference pixels, to further form the first set of reference pixels. Thus, after the first set of reference pixels is divided into N first subsets of reference pixels, the model parameters derived from the N first subsets of reference pixels are more accurate, so that the prediction model constructed according to the model parameters can be more accurate.

Further, to determine the candidate positions, a first sampling interval may be calculated first, and then the at least one edge is sampled according to the first sampling interval to determine the candidate positions of the candidate pixels corresponding to the at least one edge. Therefore, in some embodiments, determining the candidate positions of the candidate pixels based on the at least one edge of the current block may include: determining the preset number of candidate pixels, wherein the preset number of candidate pixels represents the number of selected pixels on the edge of the current block; and determining the candidate positions according to the preset number of pixels and the length of the edge of the current block, wherein the length of the edge of the current block is equal to the number of pixels on the edge of the current block.

It should be noted that the preset number of candidate pixels represents the preset number of pixels to be sampled, that is, the number of pixels contained in the subset of adjacent reference pixels. Taking the pixel positions as an example, after the preset number of candidate pixels is determined, the candidate positions of the candidate pixels may be calculated according to the length of the at least one edge and the preset number of candidate pixels; then, the appropriate reference pixels are selected, according to the candidate positions, from the adjacent reference pixels to form the subset of adjacent reference pixels.

Further, to determine the candidate positions, the first sampling interval may be calculated first, and then the at least one edge is sampled according to the first sampling interval to determine the candidate positions of the candidate pixels corresponding to the at least one edge. Therefore, in some embodiments, after the preset number of candidate pixels is determined, the method may further include: calculating the first sampling interval according to the length of the edge of the current block and the preset number of candidate pixels.

Further, after the first sampling interval is calculated, the method may further include: adjusting the first sampling interval to obtain a second sampling interval.

Further, determining the candidate positions of the candidate pixels on the edge of the current block may include: determining a reference point on the edge of the current block, and determining the candidate positions according to the first sampling interval, starting from the reference point.

It should be noted that the reference point may be a midpoint of the at least one edge, or a left-center first reference pixel position of the at least one edge, or a right-center first reference pixel position of the at least one edge, or even other reference pixel positions of the at least one edge, which is not specifically limited in the embodiment of the present application.

It should also be noted that after the first sampling interval is calculated, the first sampling interval may also be adjusted finely, for example, 1 is added to or subtracted from the first sampling interval to obtain the second sampling interval. For example, if the first sampling interval is 4, the adjusted second sampling interval may be 3 or 5. In the embodiment of the present application, minor adjustment may be made to the first sampling interval, but the specific setting for the amplitude of the adjustment in not specifically limited in the embodiment of the present application.

Further, in some embodiments, determining the candidate positions of the candidate pixels on the edge of the current block may include: determining the reference point on the edge of the current block, and determining the candidate positions at two sides of the reference point according to the first sampling interval.

Further, in some embodiments, determining the candidate positions of the candidate pixels on the edge of the current block may include: determining the reference point on the edge of the current block, and starting from the reference point, determining the candidate positions according to the second sampling interval.

Further, in some embodiments, determining the candidate positions of the candidate pixels on the edge of the current block may include: determining the reference point on the edge of the current block, and determining the candidate positions at two sides of the reference point according to the second sampling interval.

Further, in some embodiments, determining the candidate positions of the candidate pixels on the edge of the current block may include: determining the reference point on the edge of the current block, determining the candidate positions corresponding to one side of the reference point according to the first sampling interval, and determining the candidate positions corresponding to the other side of the reference point according to the second sampling interval.

It should be noted that after the reference point of the at least one edge of the current block is determined, uniform sampling may be carried out according to the first sampling interval or the second sampling interval; non-uniform sampling may also be carried out according to the first sampling interval and the second sampling interval, and the candidate positions determined after sampling may be symmetrically distributed at two sides of the reference point or asymmetrically distributed at two sides of the reference point; which in not specifically limited in the embodiment of the present application.

Further, for screening of the adjacent reference pixels, the reference pixels of the at least one edge may also be skipped, that is, unimportant reference pixels or abnormal reference pixels may be skipped (which may also be regarded as deletion processing), so as to obtain the subset of adjacent reference pixels. Also, based on this, after a part of the reference pixels of the at least one edge are skipped, the remaining reference pixels are screened to obtain the subset of adjacent reference pixels. Therefore, in some embodiments, the method may further include: determining the preset number K of skipped pixels corresponding to the at least one edge of the current block, wherein K is a non-negative integer; and starting from an end position of the edge of the current block, setting a position of the K-th pixel as the reference point, wherein the end position of the edge of the current block is a pixel position at a head end or a rear end of the edge of the current block.

It should be noted that the preset number of skipped pixels represents the preset number of pixels to be deleted or skipped. In addition, a start position of the at least one edge represents the leftmost edge position of the upper edge of the current block or the uppermost edge position of the left edge of the current block, and the end position of the at least one edge represents the rightmost edge position of the upper edge of the current block or the lowermost edge position of the left edge of the current block.

It should also be noted that the value of K may be the preset number of reference pixels, such as 1, 2 or 4, or may also be calculated according to the length of the current block and its corresponding preset ratio. However, in practical applications, it is still set according to the actual situations, which is not specifically limited in the embodiment of the present application. The preset ratio corresponding to the upper edge of the current block may be represented by a first preset ratio, and the preset ratio corresponding to the left edge of the current block may be represented by a second preset ratio. The value of the first preset ratio may be the same as or be different from the second preset ratio, which is not specifically limited in the embodiment of the present application.

Further, after N first subsets of reference pixels are determined, the model parameters of the prediction model may be calculated according to the N first subsets of reference pixels to construct the prediction model. The prediction model may include N prediction sub-models, N being a positive integer greater than or equal to 2. Therefore, in some embodiments, after the model parameters of the N prediction models are calculated respectively using the N first subsets of reference pixels, the method may further include: determining first colour component reconstruction values corresponding to the pixels in the current block; selecting one prediction sub-model from the N prediction sub-models; and calculating second colour component prediction values corresponding to the pixels in the current block according to the selected prediction sub-model and the first colour component reconstruction value corresponding to the pixels in the current block.

Further, selecting one prediction sub-model from the N prediction sub-models may include: comparing the first colour component reconstruction values corresponding to the pixels in the current block with the at least one threshold; and selecting the prediction sub-model used for the pixels in the current block from the N prediction sub-models according to a result of the comparison.

It should be noted that after the N prediction models are established, a first colour component reconstruction value corresponding to each pixel in the current block may be compared with the at least one threshold, and one prediction model corresponding to each pixel may be selected from the N prediction models according to the result of the comparison. Then, colour components to be predicted are predicted according to the selected prediction sub-models, so as to obtain prediction values of the colour components to be predicted.

It should also be noted that the prediction model may be a nonlinear model or a complex model. The complex model may be a nonlinear model in the form of nonlinear curve such as quadratic curve, or a multi-model composed of multiple linear models. Thus, for the complex model, since some unimportant reference pixels or some abnormal reference pixels have been removed from the subset of adjacent reference pixels, the N groups of model parameters determined according to the subset of adjacent reference pixels are more accurate, thereby improving the precision of the complex model and improving the prediction accuracy of the colour components to be processed.

In addition, in the embodiment of the present application, when the method for predicting colour components is applied to an encoder side, the subset of adjacent reference pixels may be constructed according to the adjacent reference pixels, then the model parameters of the prediction model may be calculated according to the subset of adjacent reference pixels, and the calculated model parameters may be written into a bitstream. The bitstream is transmitted from the encoder side to a decoder side. Accordingly, when the method for predicting colour components is applied to the decoder side, the model parameters of the prediction model may be directly obtained by parsing the bitstream. Or on the decoder side, the subset of adjacent reference pixels may be constructed according to the adjacent reference pixels, and then the model parameters of the prediction model may be calculated according to the subset of adjacent reference pixels, so as to construct the prediction model, and carry out cross-component prediction of at least one colour component of the current block using the prediction model.

The present embodiment provides a method for predicting colour components, and the specific implementation of the previous embodiments is described in detail. It can be seen, through the technical schemes of the previous embodiments, due to screening processing of the adjacent reference pixels of the current block, unimportant reference pixels or abnormal reference pixels can be removed, so as to decrease the number of pixels in the set of adjacent reference pixels, such that there are less pixels in the subset of adjacent reference pixels, thereby not only reducing computational complexity and memory bandwidth, but also improving the precision of the prediction model. In addition, by carrying out, by at least two prediction sub-models, cross-component prediction of the colour components to be predicted, the prediction accuracy of the colour components to be processed is improved, and the prediction efficiency of video pictures is improved as well.

Based on the inventive concepts same as the previous embodiments, referring to FIG. 8, which shows a schematic composition structure diagram of an encoder 80 in accordance with an embodiment of the present application, which may include a first determination unit 801, a first construction unit 802 and a first calculation unit 803, wherein the first determination unit 801 is configured to determine adjacent reference pixels of the current block in a picture; the first construction unit 802 is configured to construct a subset of adjacent reference pixels according to the adjacent reference pixels, wherein the subset of adjacent reference pixels contains a part of the adjacent reference pixels; and the first calculation unit 803 is configured to calculate model parameters of a prediction model according to the subset of adjacent reference pixels, wherein the prediction model includes N prediction sub-models, the N prediction sub-models correspond to N groups of model parameters, and the prediction sub-models are used to carry out, through corresponding model parameters, cross-component prediction of colour components to be predicted, N being a positive integer greater than or equal to 2.

In the above scheme, referring to FIG. 8, the encoder 80 may further include a first acquisition unit 804 configured to acquire reference pixels adjacent to at least one edge of the current block, wherein the at least one edge of the current block includes at least one of an upper row, a right upper row, a left column and a left lower column; and obtain the adjacent reference pixels according to the acquired reference pixels.

In the above scheme, referring to FIG. 8, the encoder 80 may further include a first selection unit 805, wherein the first determination unit 801 is further configured to determine candidate positions of candidate pixels based on the at least one edge of the current block; and the first selection unit 805 is configured to select reference pixels corresponding to the candidate positions from the adjacent reference pixels, and compose the selected reference pixels into the subset of adjacent reference pixels.

In the above scheme, the first determination unit 801 is further configured to determine the candidate positions based on pixel positions corresponding to the reference pixels adjacent to the at least one edge of the current block.

In the above scheme, the first determination unit 801 is further configured to determine the candidate positions based on colour component intensity values corresponding to the reference pixels adjacent to the at least one edge of the current block.

In the above scheme, the first determination unit 801 is further configured to determine the candidate positions based on pixel positions and colour component intensity values corresponding to the reference pixels adjacent to the at least one edge of the current block.

In the above scheme, the first determination unit 801 is further configured to determine the preset number of candidate pixels, wherein the preset number of candidate pixel represents the number of pixels sampled from the reference pixels adjacent to the at least one edge of the current block; and determine the candidate positions according to the preset number of candidate pixels and the length of the at least one edge of the current block, wherein the length of the at least one edge of the current block is equal to the number of pixels contained in the at least one edge of the current block.

In the above scheme, the first calculation unit 803 is further configured to calculate a first sampling interval according to the preset number of candidate pixels and the length of the at least one edge of the current block.

The first determination unit 801 is further configured to determine a reference point from the at least one edge of the current block, and determine the candidate positions according to the first sampling interval.

In the above scheme, referring to FIG. 8, the encoder 80 may further include a first adjustment unit 806 configured to adjust the first sampling interval to obtain a second sampling interval.

The first determination unit 801 is further configured to determine the candidate positions according to the second sampling interval based on the reference point.

In the above scheme, the first determination unit 801 is further configured to, based on the reference point, determine the candidate positions corresponding to one side of the reference point according to the first sampling interval, and determine the candidate positions corresponding to the other side of the reference point according to the second sampling interval.

In the above scheme, the first determination unit 801 is further configured to determine the preset number K of skipped pixels corresponding to the at least one edge of the current block, wherein K is a positive integer greater than or equal to 1; determine positions corresponding to the K pixels to be skipped starting from a start position and/or an end position of the at least one edge of the current block; skip continuously the K pixels to be skipped from the start position and/or the end position of the at least one edge of the current block based on the positions corresponding to the K pixels to be skipped to obtain at least one new edge of the current block; and determine the candidate positions based on the at least one new edge of the current block and the preset number of candidate pixels.

In the above scheme, the first construction unit 802 is configured to construct N first subsets of adjacent reference pixels according to the subset of adjacent reference pixels.

The first calculation unit 803 is configured to calculate N groups of model parameters corresponding to the N prediction sub-models based on the N first subsets of adjacent reference pixels, wherein each of the prediction sub-models corresponds to a set of model parameters; In the above scheme, referring to FIG. 8, the encoder 80 may further include a first division unit 807, wherein the first determination unit 801 is further configured to determine at least one threshold according to the subset of adjacent reference pixels; and the first division unit 807 is configured to divide the subset of adjacent reference pixels into the N first subsets of adjacent reference pixels according to the at least one threshold.

In the above scheme, the first determination unit 801 is further configured to determine a first colour component reconstruction value corresponding to each pixel in the current block.

The first selection unit 805 is further configured to select one prediction sub-model from the N prediction sub-models.

The first calculation unit 803 is further configured to calculate a second colour component prediction value corresponding to each pixel in the current block according to the selected prediction sub-model and the first colour component reconstruction value corresponding to each pixel in the current block, wherein the colour component to be predicted is a second colour component.

In the above scheme, referring to FIG. 8, the encoder 80 may further include a first comparison unit 808 configured to compare the first colour component reconstruction value corresponding to each pixel in the current block with the at least one threshold.

The first selection unit 805 is further configured to select the prediction sub-model corresponding to each pixel in the current block from the N prediction sub-models according to a result of the comparison.

It can be understood that, in the embodiment of the present application, a "unit" may be a portion of a circuit, a portion of a processor, a portion of a program or software, etc.; it, of course, may be a module, or may be non-modular. In addition, various components in the embodiments may be integrated into one processing unit, or various units may exist physically separately, or two or more than two units may be integrated into one unit. The integrated units may be implemented in the form of hardware, or may be implemented in the form of a software functional module.

The integrated unit, if implemented in the form of a software functional module and sold or used as an independent product, may be stored in a computer-readable storage medium. Based on such understanding, the technical scheme of the present application, in essence, or the part contributing to the prior art, or all or part of the technical scheme, may be embodied in the form of a software product, which is stored in a storage medium, and includes several instructions for causing a computer device (which may be a personal computer, a server, or a network device, etc.) to perform all or part of the acts of the methods in the embodiments. The aforementioned storage medium includes various media, such as a U disk, a mobile hard disk, a read-only memory (ROM), a random access memory (RAM), a magnetic disk, or an optical disk, which are capable of storing program codes.

Therefore, an embodiment of the present application provides a computer storage medium having a colour component prediction program stored therein, and when the colour component prediction program is executed by at least one processor, the method in accordance with any one of the embodiments is implemented.

Figure 9:
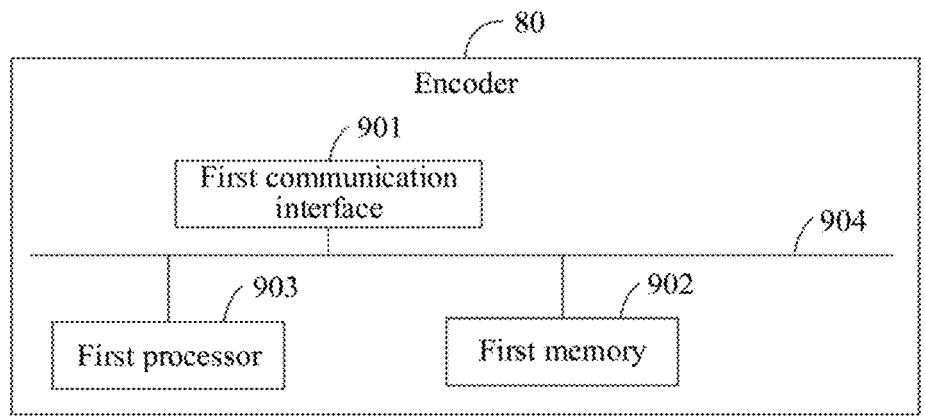
FIG. 9 is a schematic diagram of a specific hardware structure of an encoder in accordance with an embodiment of the present application.

Based on the composition of the encoder 80 and the computer storage medium described above, referring to FIG. 9, which shows an example of a specific hardware structure of an encoder 80 in accordance with an embodiment of the present application, which may include a first communication interface 901, a first memory 902 and a first processor 903 coupled together through a first bus system 904. It may be understood that the first bus system 904 is used for implementing connection and communication between these components. In addition to a data bus, the first bus system 904 includes a power bus, a control bus, and a status signal bus. However, for the sake of clarity, various buses are labeled as the first bus system 904 in FIG. 9.

The first communication interface 901 is configured to receive and send signals during reception and transmission of information from and to other external network elements.

The first memory 902 is configured to store a computer program runnable on the first processor 903.

The first processor 903 is configured to, when running the computer program, determine adjacent reference pixels of the current block in a picture; construct a subset of adjacent reference pixels according to the adjacent reference pixels, wherein the subset of adjacent reference pixels contains a part of the adjacent reference pixels; and calculate model parameters of a prediction model according to the subset of adjacent reference pixels, wherein the prediction model includes N prediction sub-models, the N prediction sub-models correspond to N groups of model parameters, and the prediction sub-models are used to preform, through corresponding model parameters, cross-component prediction of colour components to be predicted, N being a positive integer greater than or equal to 2.

It may be understood that the first memory 902 in the embodiments of the present application may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), which is used as an external buffer. Through exemplary but non-restrictive description, many forms of RAMs may be available, such as a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct Rambus dynamic random access memory (DR-RAM). It should be noted that the first memory 902 in the systems and methods described herein is intended to include, but not be limited to, these and any other suitable types of memories.

The first processor 903 may be an integrated circuit chip having a signal processing capability. In an implementation process, each of the acts of the foregoing methods may be completed through an integrated logic circuit of hardware in the first processor 903 or instructions in the form of software. The first processor 903 described above may be a general purpose processor, a digital signal processor (DSP), an application specific integrated circuit (ASIC), a field programmable gate array (FPGA) or other programmable logic devices, a discrete gate or a transistor logic device, or a discrete hardware component. The first processor 903 may implement or perform various methods, acts and logical block diagrams disclosed in the embodiments of the present application. The general purpose processor may be a microprocessor, or the processor may also be any conventional processor, or the like. The acts of the methods disclosed in the embodiments of the present application may be directly embodied to be completed by a hardware decoding processor, or may be completed by a combination of hardware and software modules in the decoding processor. The software modules may be located in a storage medium which is mature in the art, such as a random access memory, a flash memory, a read-only memory, a programmable read-only memory, an electrically erasable programmable memory, a register, etc. The storage medium is located in the first memory 902, and the first processor 903 reads information in the memory and completes the acts of the foregoing methods in combination with its hardware.

It may be understood that the embodiments described in the present application may be implemented by hardware, software, firmware, middleware, microcode or a combination thereof. For the implementation by hardware, a processing unit may be implemented in one or more application specific integrated circuits (ASICs), digital signal processors (DSPs), digital signal processing devices (DSPDs), programmable logic devices (PLDs), field-programmable gate arrays (FPGAs), general purpose processors, controllers, microcontrollers, microprocessors, other electronic units for performing the functions described in the present application, or combinations thereof. For the implementation by software, the techniques described in the present application may be implemented by modules (e.g., procedures, functions, etc.) that perform the functions described in the present application. Software codes may be stored in a memory and executed by a processor. The memory may be implemented in the processor or external to the processor.

Optionally, as another embodiment, the first processor 903 is further configured to perform the methods in accordance with any one of the previous embodiments when running the computer program.

The embodiment provides an encoder, which may include a first determination unit, a first construction unit and a first calculation unit, wherein the first determination unit is configured to determine adjacent reference pixels of the current block in a picture; the first construction unit is configured to construct a subset of adjacent reference pixels according to the adjacent reference pixels, wherein the subset of adjacent reference pixels contains a part of the adjacent reference pixels; and the first calculation unit is configured to calculate model parameters of a prediction model according to the subset of adjacent reference pixels, wherein the prediction model includes N prediction sub-models, the N prediction sub-models correspond to N groups of model parameters, and the prediction sub-models are used to carry out, through corresponding model parameters, cross-component prediction of colour components to be predicted, N being a positive integer greater than or equal to 2. In this way, the number of pixels in the set of adjacent reference pixels is decreased, such that there are less pixels in the subset of adjacent reference pixels, thereby not only reducing computational complexity and memory bandwidth, but also improving the precision of the prediction model.

Figure 10:
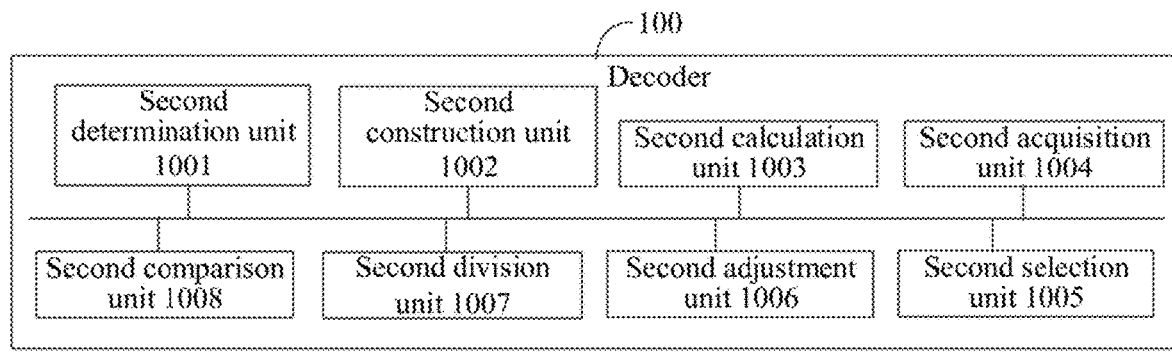
FIG. 10 is a schematic diagram of a structure of a decoder in accordance with an embodiment of the present application.

Based on the inventive concepts same as the previous embodiments, referring to FIG. 10, which shows a schematic composition structure diagram of a decoder 100 in accordance with an embodiment of the present application, which may include a second determination unit 1001, a second construction unit 1002 and a second calculation unit 1003, wherein the second determination unit 1001 is configured to determine adjacent reference pixels of the current block in a picture; the second construction unit 1002 is configured to construct a subset of adjacent reference pixels according to the adjacent reference pixels, wherein the subset of adjacent reference pixels contains a part of the adjacent reference pixels; and the second calculation unit 1003 is configured to calculate model parameters of a prediction model according to the subset of adjacent reference pixels, wherein the prediction model includes N prediction sub-models, the N prediction sub-models correspond to N groups of model parameters, and the prediction sub-models are used to carry out, through corresponding model parameters, cross-component prediction of colour components to be predicted, N being a positive integer greater than or equal to 2.

In the above scheme, referring to FIG. 10, the decoder 80 may further include a second acquisition unit 1004 configured to acquire reference pixels adjacent to at least one edge of the current block, wherein the at least one edge of the current block includes at least one of an upper row, a right upper row, a left column and a left lower column; and obtain the adjacent reference pixels according to the acquired reference pixels.

In the above scheme, referring to FIG. 10, the decoder 100 may further include a second selection unit 805, wherein the second determination unit 1001 is further configured to determine candidate positions of candidate pixels based on the at least one edge of the current block; and the second selection unit 1005 is configured to select reference pixels corresponding to the candidate positions from the adjacent reference pixels, and compose the selected reference pixels into the subset of adjacent reference pixels.

In the above scheme, the second determination unit 1001 is further configured to determine the candidate positions based on pixel positions corresponding to the reference pixels adjacent to the at least one edge of the current block.

In the above scheme, the second determination unit 1001 is further configured to determine the candidate positions based on colour component intensity values corresponding to the reference pixels adjacent to the at least one edge of the current block.

In the above scheme, the second determination unit 1001 is further configured to determine the candidate positions based on pixel positions and colour component intensity values corresponding to the reference pixels adjacent to the at least one edge of the current block.

In the above scheme, the second determination unit 1001 is further configured to determine the preset number of candidate pixels, wherein the preset number of candidate pixel represents the number of pixels sampled from the reference pixels adjacent to the at least one edge of the current block; and determine the candidate positions according to the preset number of candidate pixels and the length of the at least one edge of the current block, wherein the length of the at least one edge of the current block is equal to the number of pixels contained in the at least one edge of the current block.

In the above scheme, the second calculation unit 1003 is further configured to calculate a first sampling interval according to the preset number of candidate pixels and the length of the at least one edge of the current block.

The second determination unit 1001 is further configured to determine a reference point from the at least one edge of the current block, and determine the candidate positions according to the first sampling interval.

In the above scheme, referring to FIG. 10, the decoder 100 may further include a second adjustment unit 1006 configured to adjust the first sampling interval to obtain a second sampling interval.

The second determination unit 1001 is further configured to determine the candidate positions according to the second sampling interval based on the reference point.

In the above scheme, the second determination unit 1001 is further configured to, based on the reference point, determine the candidate positions corresponding to one side of the reference point according to the first sampling interval, and determine the candidate positions corresponding to the other side of the reference point according to the second sampling interval.

In the above scheme, the second determination unit 1001 is further configured to determine the preset number K of skipped pixels corresponding to the at least one edge of the current block, wherein K is a positive integer greater than or equal to 1; determine positions corresponding to the K pixels to be skipped starting from a start position and/or an end position of the at least one edge of the current block; skip continuously the K pixels to be skipped from the start position and/or the end position of the at least one edge of the current block based on the positions corresponding to the K pixels to be skipped to obtain at least one new edge of the current block; and determine the candidate positions based on the at least one new edge of the current block and the preset number of candidate pixels.

In the above scheme, the second construction unit 1002 is configured to construct N first subsets of adjacent reference pixels according to the subset of adjacent reference pixels.

The second calculation unit 1003 is configured to calculate N groups of model parameters corresponding to the N prediction sub-models based on the N first subsets of adjacent reference pixels, wherein each of the prediction sub-models corresponds to a set of model parameters; In the above scheme, referring to FIG. 10, the decoder 100 may further include a second division unit 1007, wherein the second determination unit 1001 is further configured to determine at least one threshold according to the subset of adjacent reference pixels; and the second division unit 1007 is configured to divide the subset of adjacent reference pixels into the N first subsets of adjacent reference pixels according to the at least one threshold.

In the above scheme, the second determination unit 1001 is further configured to determine a first colour component reconstruction value corresponding to each pixel in the current block.

The second selection unit 1005 is further configured to select one prediction sub-model from the N prediction sub-models.

The second calculation unit 1003 is further configured to calculate a second colour component prediction value corresponding to each pixel in the current block according to the selected prediction sub-model and the first colour component reconstruction value corresponding to each pixel in the current block, wherein the colour component to be predicted is a second colour component.

In the above scheme, referring to FIG. 10, the decoder 100 may further include a second comparison unit 1008 configured to compare the first colour component reconstruction value corresponding to each pixel in the current block with the at least one threshold.

The second selection unit 1005 is further configured to select the prediction sub-model corresponding to each pixel in the current block from the N prediction sub-models according to a result of the comparison.

It can be understood that, in the present embodiment, a "unit" may be a portion of a circuit, a portion of a processor, a portion of a program or software, etc.; it, of course, may be a module, or may be non-modular. In addition, various components in the embodiments may be integrated into one processing unit, or various units may exist physically separately, or two or more than two units may be integrated into one unit. The integrated units may be implemented in a form of hardware, or may be implemented in the form of a software functional module.

The integrated unit, if implemented in the form of a software functional module and sold or used as an independent product, may be stored in a computer-readable storage medium. Based on such understanding, an embodiment provides a computer storage medium having a colour component prediction program stored therein, and when the colour component prediction program is executed by the second processor, the method in accordance with any one of the embodiments is implemented.

Figure 11:
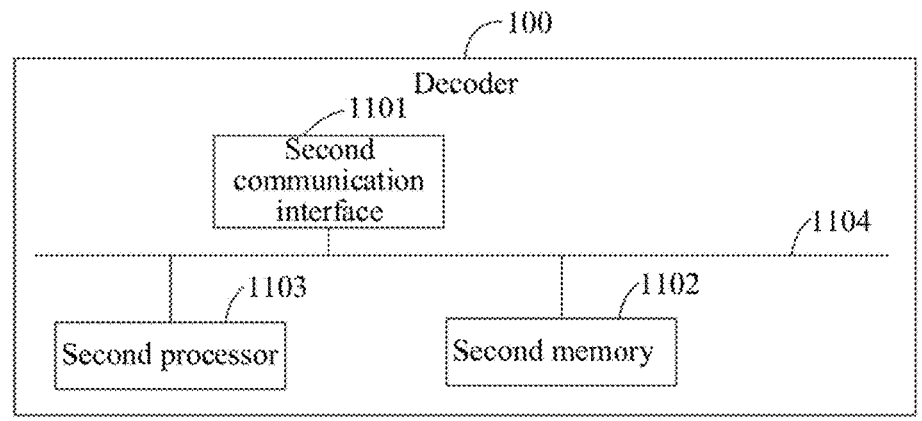
FIG. 11 is a schematic diagram of a specific hardware structure of a decoder in accordance with an embodiment of the present application.

Based on the composition of the decoder 100 and the computer storage medium described above, referring to FIG. 11, which shows a specific hardware structure of a decoder 100 in accordance with an embodiment of the present application, which may include a second communication interface 1101, a first memory 1102 and a first processor 1103 coupled together through a second bus system 1104. It may be understood that the second bus system 1104 is used for implementing connection and communication between these components. In addition to a data bus, the second bus system 1104 includes a power bus, a control bus, and a status signal bus. However, for the sake of clarity, various buses are labeled as the second bus system 1104 in FIG. 11.

The second communication interface 1101 is configured to receive and send signals during reception and transmission of information from and to other external network elements.

The second memory 1102 is configured to store a computer program runnable on the second processor 1103.

The second processor 1103 is configured to, when running the computer program, determine adjacent reference pixels of the current block in a picture; construct a subset of adjacent reference pixels according to the adjacent reference pixels, wherein the subset of adjacent reference pixels contains a part of the adjacent reference pixels; and calculate model parameters of a prediction model according to the subset of adjacent reference pixels, wherein the prediction model includes N prediction sub-models, the N prediction sub-models correspond to N groups of model parameters, and the prediction sub-models are used to preform, through corresponding model parameters, cross-component prediction of colour components to be predicted, N being a positive integer greater than or equal to 2.

Optionally, as another embodiment, the second processor 1103 is further configured to perform the methods in accordance with any one of the previous embodiments when running the computer program.

It can be understood that hardware functions of the second memory 1102 are similar to those of the first memory 902, and hardware functions of the second processor 1103 are similar to those of the first processor 903, and will not be repeated herein in detail.

The embodiment provides a decoder, which may include a second determination unit, a second construction unit and a second calculation unit, wherein the second determination unit is configured to determine adjacent reference pixels of the current block in a picture; the second construction unit is configured to construct a subset of adjacent reference pixels according to the adjacent reference pixels, wherein the subset of adjacent reference pixels contains a part of the adjacent reference pixels; and the second calculation unit is configured to calculate model parameters of a prediction model according to the subset of adjacent reference pixels, wherein the prediction model includes N prediction sub-models, the N prediction sub-models correspond to N groups of model parameters, and the prediction sub-models are used to carry out, through corresponding model parameters, cross-component prediction of colour components to be predicted, N being a positive integer greater than or equal to 2. In this way, the number of pixels in the set of adjacent reference pixels is decreased, such that there are less pixels in the subset of adjacent reference pixels, thereby not only reducing computational complexity and memory bandwidth, but also improving the precision of the prediction model.

It should be noted that in the present application, the terms "include", "contain" or any other variations thereof are intended to cover a non-exclusive inclusion, such that a process, method, article, or device that includes a list of elements includes not only those elements but also other elements not expressly listed, or further includes elements inherent to such process, method, article, or apparatus. An element defined by a statement "include one" does not exclude presence of additional identical elements in the process, method, article or system that includes the element, without more limitations.

The above-mentioned serial numbers of the embodiments of the present application are only for description, and do not represent advantages and disadvantages of the embodiments.

The methods disclosed in several method embodiments provided in the present application may be arbitrarily combined without conflict to obtain a new method embodiment.

The features disclosed in several product embodiments provided in the present application may be arbitrarily combined without conflict to obtain a new product embodiment.

The features disclosed in several method or device embodiments provided in the present application may be arbitrarily combined without conflict to obtain a new method embodiment or device embodiment.

What are described above are merely specific implementations of the present application, but the protection scope of the present application is not limited thereto. Any variation or substitution that may easily occur to a person skilled in the art within the technical scope disclosed by the present application shall be included within the protection scope of the present application. Therefore, the protection scope of the present application shall be subject to the protection scope of the claims.

INDUSTRIAL APPLICABILITY

In the embodiments of the present application, adjacent reference pixels of the current block in a picture is determined; then a subset of adjacent reference pixels is constructed according to the adjacent reference pixels, wherein the subset of adjacent reference pixels contains a part of the adjacent reference pixels; and model parameters of a prediction model are calculated according to the subset of adjacent reference pixels, wherein the prediction model includes N prediction sub-models, the N prediction sub-models correspond to N groups of model parameters, and the prediction sub-models are used to carry out, through corresponding model parameters, cross-component prediction of colour components to be predicted, N being a positive integer greater than or equal to 2; in this way, due to screening processing of the adjacent reference pixels of the current block, unimportant reference pixels or abnormal reference pixels can be removed, so as to decrease the number of pixels in the set of adjacent reference pixels, such that there are less pixels in the subset of adjacent reference pixels, thereby not only reducing computational complexity and memory bandwidth, but also improving the precision of the prediction model. In addition, by carrying out, by at least two prediction sub-models, cross-component prediction of the colour components to be predicted, the prediction accuracy of the colour components to be processed is improved, and the prediction efficiency of video pictures is improved as well.

From the foregoing, it will be appreciated that specific embodiments of the invention have been described herein for purposes of illustration, but that various modifications may be made without deviating from the scope of the invention. Accordingly, the invention is not limited except as by the appended claims.

The invention claimed is:

1. A method for predicting colour components, which is applied to an encoder, the method comprising:
   determining adjacent reference samples of a current block in a picture;
   constructing a subset of adjacent reference samples according to the adjacent reference samples, wherein the subset of adjacent reference samples contains a part of the adjacent reference samples; and
   calculating model parameters of a prediction model according to the subset of adjacent reference samples, wherein the prediction model comprises N prediction sub-models, the N prediction sub-models correspond to N groups of model parameters, and the prediction sub-models are used to perform, through corresponding model parameters, cross-component prediction of colour components to be predicted,
   wherein constructing the subset of adjacent reference samples according to the adjacent reference samples comprises:
   determining candidate positions of candidate samples based on at least one edge of the current block; and determining reference samples corresponding to the candidate positions from the adjacent reference samples, and forming the subset of adjacent reference samples with the determined reference samples;
   wherein determining the candidate positions of the candidate samples based on the at least one edge of the current block comprises:
   calculating a first sampling interval according to a preset number of candidate samples and a length of the at least one edge of the current block; and determining a reference point from the at least one edge of the current block, and determining the candidate positions according to the first sampling interval.

2. The method of claim 1, wherein determining the adjacent reference samples of the current block in the picture comprises:
acquiring reference samples adjacent to at least one edge of the current block, wherein the at least one edge of the current block comprises at least one of: an upper row, a right upper row, a left column and a left lower column; and
obtaining the adjacent reference samples according to the acquired reference samples.

3. The method of claim 1, wherein determining the candidate positions of the candidate samples based on the at least one edge of the current block comprises:
determining the candidate positions based on sample positions corresponding to reference samples adjacent to the at least one edge of the current block.

4. The method of claim 1, wherein determining the candidate positions of the candidate samples based on the at least one edge of the current block comprises:
determining the candidate positions based on colour component intensity values corresponding to reference samples adjacent to the at least one edge of the current block.

5. The method of claim 1, wherein determining the candidate positions of the candidate samples based on the at least one edge of the current block comprises:
determining the candidate positions based on sample positions and colour component intensity values corresponding to the reference samples adjacent to the at least one edge of the current block.

6. The method of claim 1, wherein the candidate positions of the candidate samples are determined according to formulas of:

$$\Delta = \text{length}/(N_2/2)$$

$$\text{shift} = \Delta/2$$

wherein $\Delta$ represents a sampling interval, length represents a quantity of reference samples in a row adjacent to an upper edge of the current block or a quantity of reference samples in a column adjacent to a left edge of the current block, $N_2$ represents an expected quantity of reference samples forming the subset of adjacent reference samples of the current block, and shift represents a starting point position of a determined reference sample.

7. The method of claim 1, wherein after calculating the first sampling interval, the method further comprises:
adjusting the first sampling interval to obtain a second sampling interval; and
determining the candidate positions according to the second sampling interval based on the reference point.

8. A method for predicting colour components, which is applied to a decoder, the method comprising:
determining adjacent reference samples of a current block in a picture;
constructing a subset of adjacent reference samples according to the adjacent reference samples, wherein the subset of adjacent reference samples contains a part of the adjacent reference samples; and
calculating model parameters of a prediction model according to the subset of adjacent reference samples, wherein the prediction model comprises N prediction sub-models, the N prediction sub-models correspond to N groups of model parameters, and the prediction sub-models are used to perform, through corresponding model parameters, cross-component prediction of colour components to be predicted,
wherein constructing the subset of adjacent reference samples according to the adjacent reference samples comprises:
determining candidate positions of candidate samples based on at least one edge of the current block; and determining reference samples corresponding to the candidate positions from the adjacent reference samples, and forming the subset of adjacent reference samples with the determined reference samples;
wherein determining the candidate positions of the candidate samples based on the at least one edge of the current block comprises:
calculating a first sampling interval according to a preset number of candidate samples and a length of the at least one edge of the current block; and determining a reference point from the at least one edge of the current block, and determining the candidate positions according to the first sampling interval.

9. The method of claim 8, wherein determining the adjacent reference samples of the current block in the picture comprises:
acquiring reference samples adjacent to at least one edge of the current block, wherein the at least one edge of the current block comprises at least one of: an upper row, a right upper row, a left column and a left lower column; and
obtaining the adjacent reference samples according to the acquired reference samples.

10. The method of claim 8, wherein determining the candidate positions of the candidate samples based on the at least one edge of the current block comprises:
determining the candidate positions based on sample positions corresponding to reference samples adjacent to the at least one edge of the current block.

11. The method of claim 8, wherein determining the candidate positions of the candidate samples based on the at least one edge of the current block comprises:
determining the candidate positions based on colour component intensity values corresponding to reference samples adjacent to the at least one edge of the current block.

12. The method of claim 8, wherein determining the candidate positions of the candidate samples based on the at least one edge of the current block comprises:
determining the candidate positions based on sample positions and colour component intensity values corresponding to the reference samples adjacent to the at least one edge of the current block.

13. The method of claim 8, wherein the candidate positions of the candidate samples are determined according to formulas of:

$$\Delta = \text{length}/(N_2/2)$$

$$\text{shift} = \Delta/2$$

wherein $\Delta$ represents a sampling interval, length represents a quantity of reference samples in a row adjacent to an upper edge of the current block or a quantity of reference samples in a column adjacent to a left edge of the current block, $N_2$ represents an expected quantity of reference samples forming the subset of adjacent reference samples of the current block, and shift represents a starting point position of a determined reference sample.

14. The method of claim 8, wherein after calculating the first sampling interval, the method further comprises:
adjusting the first sampling interval to obtain a second sampling interval; and
determining the candidate positions according to the second sampling interval based on the reference point.

15. An encoder comprising a first memory and a first processor, wherein
the first memory is configured to store a computer program runnable on the first processor; and
the first processor is configured to, when running the computer program, perform the method of claim 1.

16. A decoder comprising a second memory and a second processor, wherein
the second memory is configured to store a computer program runnable on the second processor; and
the second processor is configured to, when running the computer program, perform the method of claim 8.

* * * * *